US011176266B2

(12) United States Patent
Gallardo

(10) Patent No.: US 11,176,266 B2
(45) Date of Patent: Nov. 16, 2021

(54) RESTRICTIONS ON VIRTUALIZED SESSIONS USING RISK FACTOR ASSESSMENT

(71) Applicant: Citrix Systems, Inc., Fort Lauderdale, FL (US)

(72) Inventor: Xavier Gallardo, Fort Lauderdale, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 70 days.

(21) Appl. No.: 16/732,444

(22) Filed: Jan. 2, 2020

(65) Prior Publication Data

US 2021/0209243 A1  Jul. 8, 2021

(51) Int. Cl.
*G06F 16/18* (2019.01)
*G06F 21/62* (2013.01)
*G06F 16/188* (2019.01)

(52) U.S. Cl.
CPC ........ *G06F 21/6227* (2013.01); *G06F 16/188* (2019.01)

(58) Field of Classification Search
CPC ............................ G06F 21/6227; G06F 16/188
See application file for complete search history.

(56) References Cited

U.S. PATENT DOCUMENTS

| | | | |
|---|---|---|---|
| 2007/0083501 A1* | 4/2007 | Pedersen | G06F 16/10 |
| 2007/0083522 A1* | 4/2007 | Nord | G06F 16/10 |
| 2007/0208713 A1* | 9/2007 | Krishnaprasad | G06F 16/951 |
| 2007/0288247 A1* | 12/2007 | Mackay | G06F 16/113 705/1.1 |
| 2009/0132285 A1* | 5/2009 | Jakobovits | G06F 3/0482 705/3 |
| 2009/0254572 A1* | 10/2009 | Redlich | G06Q 10/06 |
| 2014/0108351 A1* | 4/2014 | Nallathambi | G06F 11/1464 707/639 |
| 2015/0163206 A1* | 6/2015 | McCarthy | H04L 63/06 713/171 |
| 2017/0041296 A1* | 2/2017 | Ford | G06F 16/951 |

\* cited by examiner

*Primary Examiner* — Eliyah S. Harper
(74) *Attorney, Agent, or Firm* — Pierce Atwood LLP

(57) ABSTRACT

One example disclosed method involves a computing system providing a client device a virtualized computing environment. Upon receiving a request to access a file or folder in the virtualized computing environment from the client device, a file system filter driver of the computing system may intercept the request, and determine authorization to access the file or folder based at least in part on a security policy associated with the user account. If the client device is authorized to access the file or folder, the computing system may cause the client device to output a representation of contents of the first file or folder using the virtualized computing environment.

23 Claims, 11 Drawing Sheets

RESTRICTIONS ON VIRTUALIZED SESSIONS USING RISK FACTOR ASSESSMENT

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, at least one computing device performs a method involving providing a virtualized computing environment associated with a user account to a client device, receiving a first request identifying a first file or folder to be accessed using the virtualized computing environment from the client device, and intercepting the first request by a file system filter driver. The file system filter driver determines, based at least in part on a security policy associated with the user account, that the virtualized computing environment is authorized to access the first file or folder. The client device is caused to output a representation of contents of the first file or folder using the virtualized computing environment.

In other disclosed embodiments, at least one computing device performs a method involving providing a virtualized computing environment associated with a user account to a client device, determining that a first icon corresponding to a first file or folder is to be presented on a display of the client device using the virtualized computing environment, determining that the virtualized computing environment currently is not authorized to access the first file or folder based at least in part on a security policy associated with the user account, and causing the client device to display the first icon together with an indication that the first file or folder cannot currently be accessed using the virtual computing environment.

In other disclosed embodiments, at least one computing device performs a method involving providing a virtualized computing environment associated with a user account to a client device, receiving a first request identifying a first file to be accessed using the virtualized computing environment from the client device where the first file is located within a folder, determining that the virtualized computing environment is authorized to access the first file based at least in part on a security policy associated with the user account, causing the client device to output a representation of contents of the first file using the virtualized computing environment, receiving a second request identifying a second file to be accessed using the virtualized computing environment from the client device where the second file is also located within the folder, determining that the virtualized computing environment is not authorized to access the second file based at least in part on the security policy, and causing the client device to output an indication that the second file cannot currently be accessed using the virtual computing environment.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A provides an introduction to example embodiments of a virtualization server system configured in accordance with the present disclosure;

Section B describes a network environment and computing environment which may be useful for practicing embodiments described herein;

Section C describes a high-level architecture of a desktop virtualization system;

Section D provides a detailed description of example embodiments of a virtualization server system configured in accordance with the present disclosure; and Section E describes example implementations of methods, systems, and computer-readable media in accordance with the present disclosure.

A. Introduction to Illustrative Embodiments of a Virtualization Server System

Figure 1A:
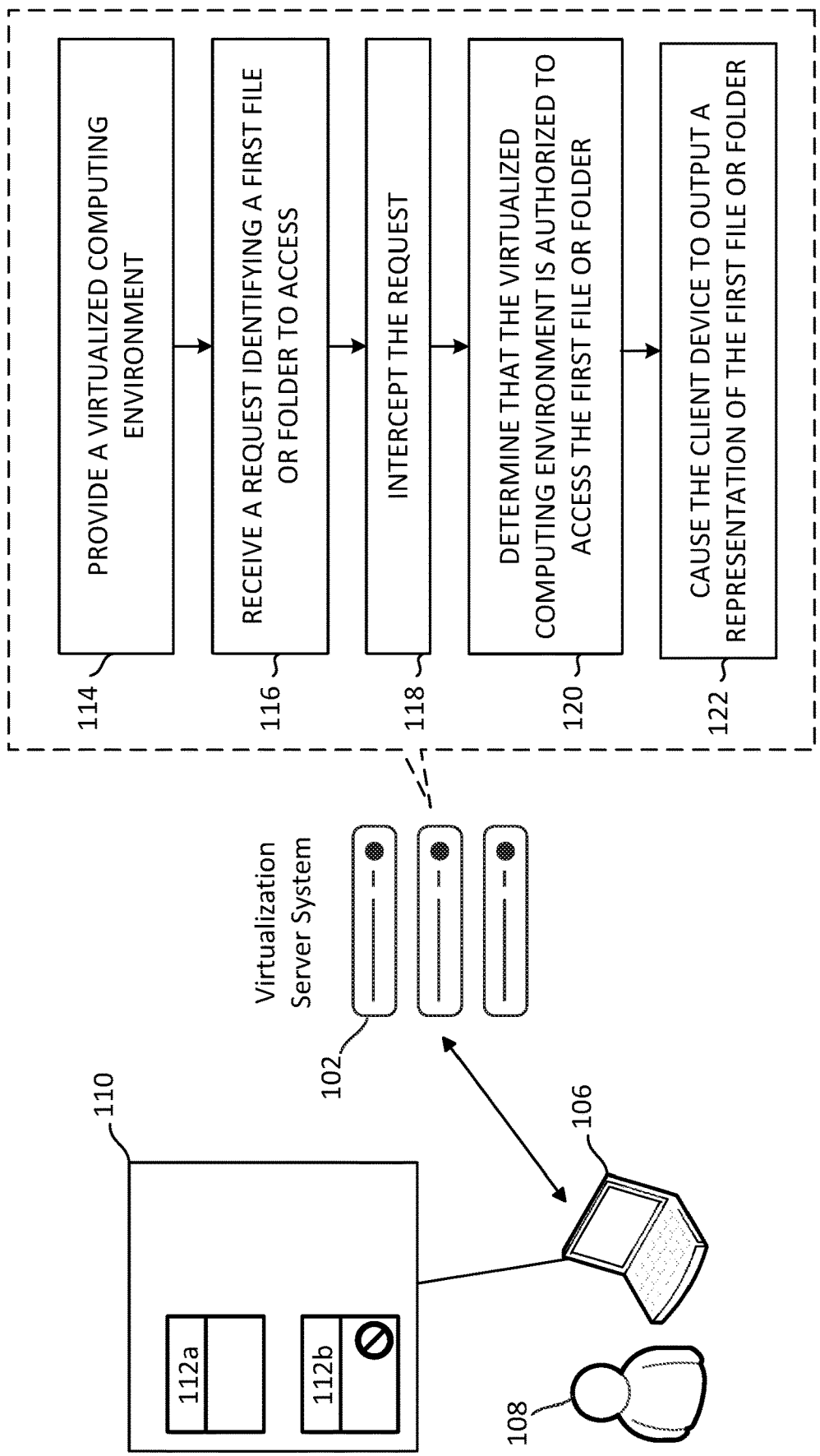
FIG. 1A is a diagram illustrating certain features of an example of a virtualization server system configured in accordance with the present disclosure.
Figure 1B:
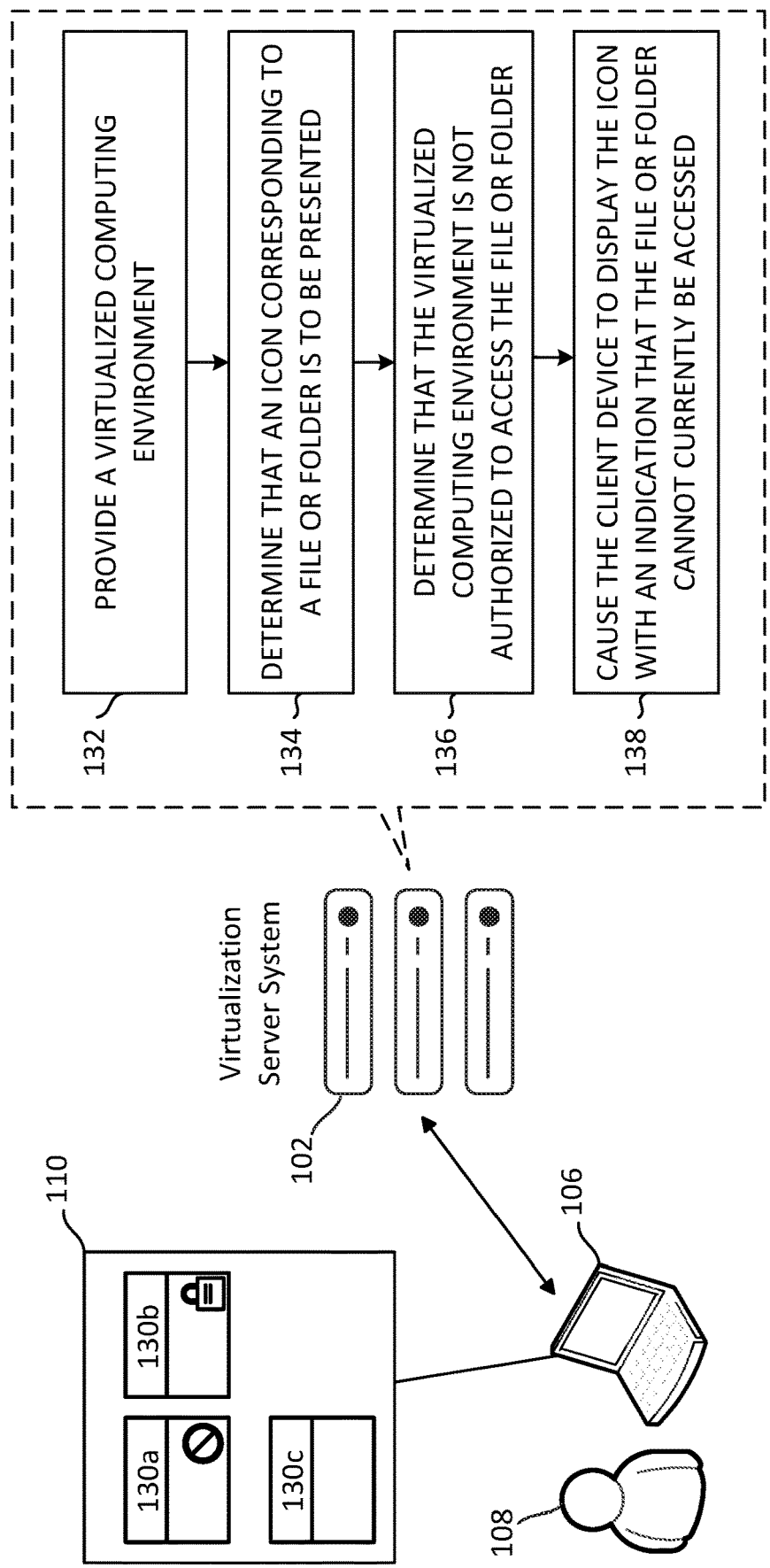
FIG. 1B is a diagram illustrating certain features of another example of a virtualization server system configured in accordance with the present disclosure.
Figure 1C:
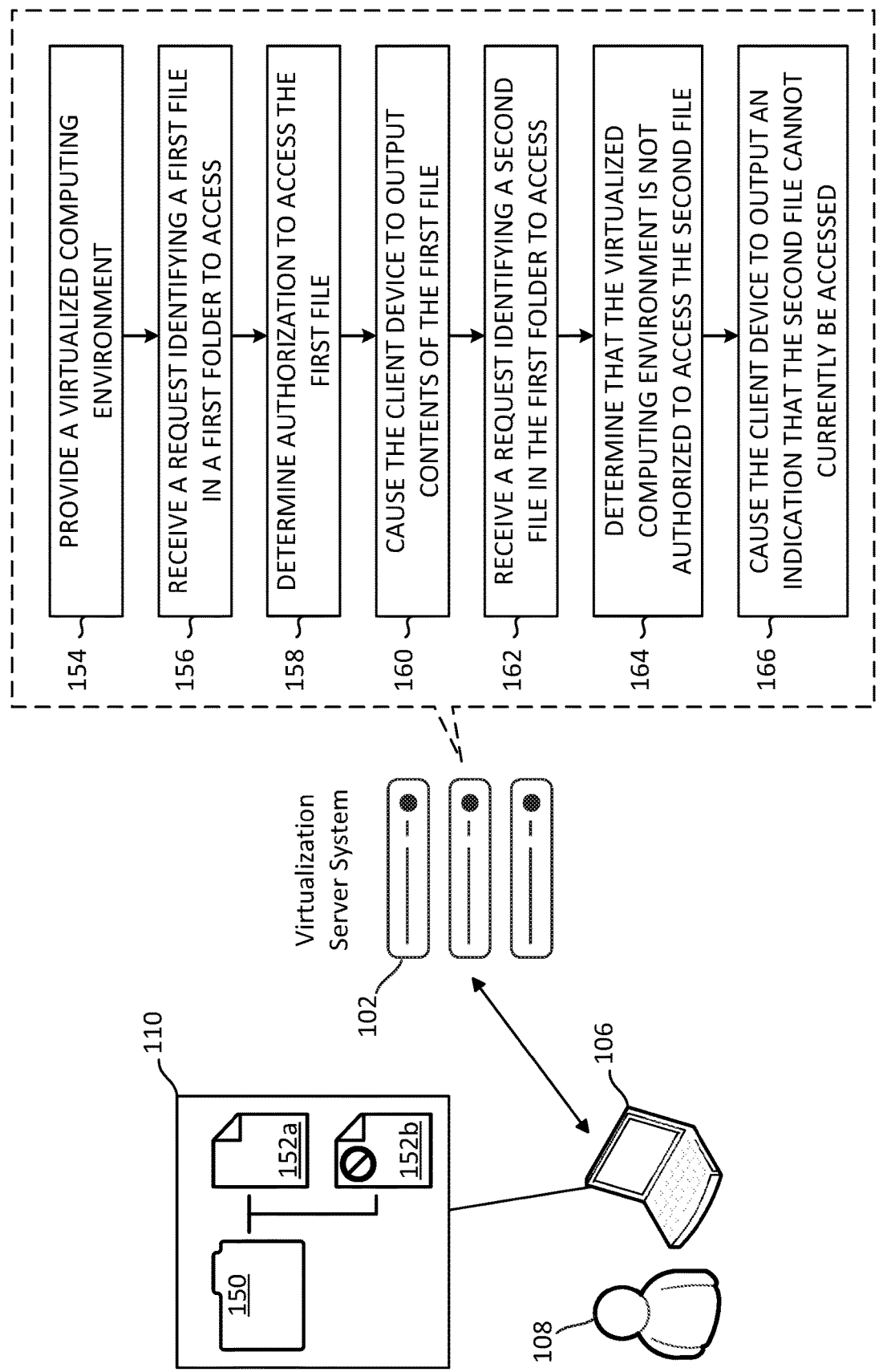
FIG. 1C is a diagram illustrating certain features of yet another example of a virtualization server system configured in accordance with the present disclosure.

FIGS. 1A-C show example embodiments of a virtualization server system 102 that may be used to implement various aspects of the present disclosure. Although the illustrated examples show the virtualization server system 102 as including three servers, it should be appreciated that the virtualization server system 102 may include any number of servers (including only a single server) as well as any number of additional or different components, such as one or more databases, other network components, etc. The servers may include, for example, the virtualization server 410 described below with reference to FIG. 4 for providing a desktop virtualization service to a client device. Desktop virtualization is the concept of separating the logical desktop from the physical machine. For example, the system 102 may host files and execute applications, and provide an environment to the client device 106 that allows the user 108 to access the files and applications as though they existed locally on the client device 106. The client device 106 may be a personal computer, a mobile device such as a tablet or mobile phone, or a thin client. The virtualized computing environment provided by the system 102 may provide the client device 106 with services beyond its hardware capabilities, or provide secure access to the files and applications on the system 102.

When a user is connected to a virtualized app or desktop, security policies may be applied to the user's session based on the perceived security of the client, which may include but are not limited to an analysis of the network from which the user is connecting from, whether the user's device is running the latest operating system (OS) security patches, and whether the user's device is running up-to-date antivirus software. The security policies may supersede whatever local file permissions the user (or a client device 106) may have when operating locally—for example, within the office—versus via the virtualized computing environment. These security policies, among other actions, may restrict the duration of the user's session, the virtualized apps or desktops they have access to, or the shared network file-storage drives that may be mapped to the user's session. This disclosure proposes applying a file system filter driver to the user's virtualized session that may log, observe, modify, and/or prevent the input/output (I/O) operations within said session. In some embodiments, the file system filter driver may be initialized with the initial security policies that were applied to the session along with a user's risk assessment score provided by a policy administrator, and may continuously monitor the user's actions to provide one or more of the following:

- A determination of what files and folders are visible to the user when a query is sent to the driver.
- A determination of what actions the user may perform with respect to any file or folder.
- An audit log for what actions the user attempted to perform with regards to file access. Information from the audit log may be fed back into existing auditing features available to the administrator, as well as to the policy administrator for a re-assessment of the user's risk factor that may be applied to the current virtualization session as well as future sessions.

This disclosure also specifies for the creation of a shell extension handler for icons, otherwise referred to as an icon handler, that may manipulate the icons of files and folders that are filtered by the file system filter driver; for example, to overlay a custom graphical icon on top of the file or folder's icon in a file explorer window that represents the current restrictions applicable to said file or folder based on the user's current perceived security.

FIG. 1A is a diagram illustrating certain features of an example of a virtualization server system 102 configured in accordance with the present disclosure. The system 102 may be in communication via a computer network with one or more client devices 106 associated with a respective user 108. The client device 106 may have a display 110, such as a monitor, screen, or touchscreen for displaying information to the user 108. In the example shown in FIG. 1A, the display 110 currently shows two visualizations of files or folders in the form of icons 112a and 112b (collectively "icons 112"). As shown, the virtualization server system 102 may, at a step 114, provide a virtualized computing environment. The system 102 may provide the virtualized computing environment with privileges and/or restrictions specified by a security policy.

In some implementations, prior to an initiation of a virtual computing session, the client device 106 may send data regarding a security policy to the system 102. The security policy may be embodied in, for example, a session token. The security policy may be associated with a user account of the user 108, the client device 106, and/or virtual computing environment, and may include information about what access the system 102 should grant thereto. The security policy may be as simple as a general allowance to access all services of the system 102 or as granular as specifying individual files, folder, and/or applications to which the user 108, the client device 106, and/or virtual computing environment should be granted access. The security policy may specify what actions the user may perform and how the client device 106 may connect to the system 102; e.g., whether or not the client device 106 may connect via a public network, what forms of encryption for the connection are permissible, etc.

At step 116, the virtualization server system 102 may receive, from the client device 106, a request identifying a file or folder to be accessed using the virtualized computing environment. For example, the client device 106 may receive input indicating that the user 108 has attempted to open or otherwise access the file or folder represented by the icon 112a.

At step 118, a file system filter driver of the virtualization server system 102 may intercept the request. The filter driver may be a kernel-mode program or module inserted into the driver stack of the system 102. In some implementations, the filter driver may be a minifilter, an extended Berkeley packet filter, or a kernel module. The filter driver may filter input and output operations for a device, a class of devices, or a bus, and to provide modifications or enhancements to the behavior of an input or output device. In various implementations, the filter driver can log, observe, modify, and/or block I/O operations. The filter driver may intercept the request from the client device 108 and apply a security policy associated with the user account. The security policy may supersede file/folder permissions provided to the user when operating on the local, private network (i.e., in the office).

At step 120, the file system filter driver of the virtualization server system 102 may determine, based at least in part on the security policy, that the virtualized computing environment is authorized to access the first file or folder. The authorization may be based on a blanket authorization to the virtualized computing environment to all resources of the system 102; to certain classes of files, folders, or applications of the system 102; or to just the individual file or folder to which the request pertains.

At step 122, the virtualization server system 102 may, subject to the determination of step 120, cause the client device to output a representation of contents of the first file or folder using the virtualized computing environment. For example, if the user 108 requested access to a file, the system 102 may allow the file to be opened, modified, and/or deleted via the virtualized computing environment. If the user 108 requested access to folder file, the system 102 may reveal the contents of the folder, and may additionally allow the folder contents to be individually accessed, modified, and/or deleted via the virtualized computing environment.

In some cases, however, at step 120, the system 102 may determine that the security policy does not allow access of a second file or folder to the virtualized computing environment. In such case, the system 102 may cause the client device to output an indication that the second file or folder, represented in FIG. 1A as the icon 112b, cannot currently be accessed using the virtual computing environment. The indication may include some form of visual and/or audible output such as an error, pop-up, dialog box, or audible sound effect. In some implementations, the system 102 may provide details regarding the lack of access. For example, the system 102 may cause the client device to display information such as "You do not have access to this file", "You cannot access this file outside of the office", "You cannot access this file from a virtualized computing environment", "Your client device's security settings are out of date and require an update before you may access this file", "Access to this file has been temporarily revoked for security reasons", etc. In some implementations, the system 102, either prior to or following the attempted access of the second file or folder, may cause the client device to output a representation of the second file or folder together with an indication that the second file or folder cannot currently be accessed using the virtual computing environment. For example, the system 102 may cause the virtualized computing environment to show an icon or other visual indicator of the second file or folder that includes a "no," "locked," or "forbidden" symbol such as the circle and slash symbol shown on the icon 112b. In some implementations, the security policy may additionally or alternatively provide for a read-only level of access to files and/or folders. For example, the system 102 may determine that the security policy allows for read-only access of a third file or folder. In such cases, the system 102 may cause the client device to output a representation of contents of the third file or folder using the virtualized computing environment, thus allowing the user 108 to see or view the contents. In such implementations, however, if the system 102 receives a request to modify contents of the third file folder, the system 102 may deny the request based on the determination that the virtualized computing environment is authorized for read-only access of the third file folder. Visual indicators of varying levels of access to files and folders is discussed further below with reference to FIG. 1B.

In some implementations, the system 102 and the security policy may specify authorizations at a file-level granularity. That is, the security policy may authorize access to a first file in a folder, but deny access to a second file in the same folder. An example process may include receiving, by the system 102 from the client device 106, a first request to access a first file in a folder. The system 102 may determine, based on the security policy, that the virtualized computing environment is authorized to access the first file. The system 102 may cause the client device 106 to output a representation of contents of the first file using the virtualized computing environment. Prior to, concurrently with, or subsequent to receiving the first request, the system 102 may receive a second request to access a second file in the same folder. The system 102 may determine, based on the security policy, that the virtualized computing environment is not authorized to access the second file. The system 102 may cause the client device 106 to output an indication that the second file cannot currently be accessed using the virtual computing environment.

In some implementations, the security policy may include policies based on a risk score. For example, the system 102 may calculate a risk score for the user 108 and/or the client device 106. The security policy may include information regarding what files, folder, and/or applications are accessible for a given risk score. If the system 102 calculates a risk score that is relatively low, the security policy may indicate access to certain files, folder, and/or applications that may be restricted if the system 102 calculates a higher risk score. In an example operation, the system 102 may calculate a first value of a risk score associated with the user account. Determining that the virtualized computing environment is authorized to access a file or folder may include determining that the first value of the risk score satisfies a first condition. In some implementations, the security policy may specify a second condition for accessing a second file or folder. Accordingly, the system 102 may determine that the virtualized computing environment is not authorized to access the second file or folder by determining that the first value of the risk score does not satisfy the second condition.

In some implementations, the system 102 may calculate and recalculate the risk score based on detected behaviors of the client device 106 (or other devices associated with the user 108). Various types of behaviors may lead to an increased risk score. For example, if the system 102 receives requests from the client device 106 to access (e.g., copy) large numbers of files, repeated attempts to access files restricted by the security policy, attempts to defeat security measures, and/or changing network conditions such as moving to a less secure network, such behaviors may lead to an increased risk score. In some implementations, the system 102 may calculate the risk score based on previous behaviors associated with the user 108; for example, during previous virtualized computing sessions or in concurrent sessions. In some implementations, the system 102 may base the value of the risk score based on the geographic distance between the origins of the respective sessions. In some implementations, the system 102 may calculate the risk score based on behaviors that interfere with other users' access to the system 102, such as overusing or monopolizing system resources, or executing operations that affect the security or performance of other users' virtualized computing sessions. In some implementations, the system 102 can adjust the value of the risk score over time, even in absence of additional behavioral indicators or policy modifications. For example, the system 102 may lower the value of the risk score over time if it receives no negative behavioral indicators. In some implementations, the effect of behaviors on the value of the risk score can vary based on the number or frequency of behavioral events. In some implementations, the system 102 can recognize different user priorities. For example, the system 102 may increase the value of a risk score corresponding to a high priority user less than it would lower priority user based on the same received behavioral indicator. In another example, the system 102 may lower a high priority user's risk score value more quickly over time relative to a lower priority user. In an example operation, the system 102 may calculate a second value of the risk score based on a detected behavior associated with the user account. The system 102 may subsequently receive a second request to access the first file or folder (i.e., to which the client device 106 could previously access). The system 102 may determine, based on the second value failing to satisfy the first condition, that the virtualized computing environment is not authorized to access the first file folder. Thus, the system 102 may cause the client device 106 to indicate that the first file or folder cannot currently be accessed using the virtual computing environment.

FIG. 1B is a diagram illustrating certain features of another example of a virtualization server system 102 configured in accordance with the present disclosure. The system 102 may be in communication via a computer network with one or more client device 106 associated with a respective user 108. The system 102 may include an icon handler to provide and/or modify icons representing files and folders based on the client device's 106 authorization to access and/or modify the files and folders. The client device 106 may have a display 110, such as a monitor, screen, or touchscreen for displaying information to the user 108. In the example shown in FIG. 1B, the display 110 currently shows three visualizations of files or folders in the form of icons 130*a*, 130*b*, and 130*c* (collectively "icons 130").

As shown, the virtualization server system 102 may, at a step 132, provide a virtualized computing environment. At step 134, the virtualization server system 102 may determine that a first icon 130*a* corresponding to a first file or folder is to be presented on the display 110 using the virtualized computing environment. At step 136, the virtualization server system 102 may determine, based at least in part on a security policy associated with the user account, that the virtualized computing environment currently is not authorized to access the first file or folder. At step 138, the virtualization server system 102 may cause the client device to display the first icon 130*a* together with an indication that the first file or folder cannot currently be accessed using the virtual computing environment. In the illustrated example, that indication is a circle-and-slash symbol superimposed over the icon 130*a*.

In some implementations, the system 102 may receive, from the client device 106, a first request to access the first file or folder. The system 102 may intercept the first request using a file system filter driver. The system 102 may deny the first request, based on the determination that the virtualized computing environment is not authorized to access of the first file or folder.

In some implementations, the system 102 may determine that a second icon 130*b* corresponding to a second file or folder is to be presented on the display. The system 102 may determine that the virtualized computing environment has authorization for read-only access of the second file or folder. The system 102 may thus cause the client device 106 to display the second icon 130*b* together with an indication that the second file or folder can be accessed as read-only using the virtual computing environment. In the example shown in FIG. 1B, that indication is a padlock symbol superimposed over the icon 130*b*. In some implementations, the system 102 may receive, from the client device 106, a first request to modify the second file or folder. The system 102 may intercept the first request using a file system filter driver, and may deny the first request based on the determination that the virtualized computing environment is authorized for read-only access of the first file or folder.

In some implementations, the system 102 may cause the client device 106 to display a third icon 130*c* corresponding to a third file or folder. The system 102 may determine that the virtualized computing environment currently is authorized to access the third file or folder. Thus, the system 102 may cause the client device 106 to display the third icon 130*c* together with an indication that the third file or folder can currently be accessed using the virtual computing environment. In the example shown in FIG. 1B, the indication is simply a presentation of the third icon 130*c* without modification. In some implementations, the indication may be an affirmative symbol such as a thumbs-up, a check mark, a green tint, etc. In some implementations, subsequent to causing the client device 106 to display the third icon 130*c* together with an indication that the third file or folder can currently be accessed, the system 102 may determine, based at least in part on the security policy and a detected behavior associated with the user account, that authorization to access to the third file or folder is to be revoked. Such a behavior could, for example, include any of those listed previously, including receiving requests from the client device 106 to access (e.g., copy) large numbers of files, repeated attempts to access files restricted by the security policy, attempts to defeat security measures, and/or changing network conditions, such as moving to a less secure network. Such behaviors may lead to an increased risk score. The system 102 may thus cause the client device 106 to output an indication that the third file or folder cannot currently be accessed using the virtual computing environment. The indication may be, for example, a superimposed circle-and-slash symbol to the third icon 130*c*, similar to the first icon 130*a*.

FIG. 1C is a diagram illustrating certain features of yet another example of a virtualization server system 102 configured in accordance with the present disclosure. The system 102 may be in communication via a computer network with one or more client device 106 associated with a respective user 108. The client device 106 may have a display 110, such as a monitor, screen, or touchscreen for displaying information to the user 108. The system 102 may control file access with file-by-file granularity within folders. In the example shown in FIG. 1C, the display 110 currently shows three visualizations of files or folders in the form of folder icon 150 and file icons 152*a* and 152*b* (collectively "icons 150"). As shown, the virtualization server system 102 may, at a step 154, provide a virtualized computing environment. At step 156, the system 102 may receive, from the client device 106, a first request identifying a first file represented by the icon 152*a* to be accessed using the virtualized computing environment, the first file being located within the folder represented by the icon 150. At step 158, the system 102 may determine, based at least in part on a security policy associated with the user account, that the virtualized computing environment is authorized to access the first file. At step 160, the system 102 may cause the client device 106 to output a representation of contents of the first file using the virtualized computing environment. At step 162, the system 102 may receive, from the client device 106, a second request identifying a second file represented by the icon 152*b* to be accessed using the virtualized computing environment, the second file also being located within the folder. At step 164, the system 102 may determine, based at least in part on the security policy, that the virtualized computing environment is not authorized to access the second file. At step 166, the system 102 may cause the client device 106 to output an indication that the second file cannot currently be accessed using the virtual computing environment. In this case, the indication is a circle-and-slash symbol superimposed over the file icon.

In some implementations, the system 102 may implement a behavior-based revocation of access. The system 102 can accomplish access control by routing I/O operations through a file system filter driver, as described further below. The system 102 may determine, based at least in part on the security policy and a behavior of the client device 106, that authorization to access to the first file should be revoked. Behavior-based access can be based on an assessment of risk for a user account associated with the virtualized computing environment. For example, the security policy may specify permissions for file and folder access that depend on a value of a risk score associated with the user account. If the system 102 detects behaviors that indicate a higher risk assessment, such as behaviors that pose a risk to the integrity of the system 102 or to the security of files maintained by the system 102, the system 102 may increase the value of the risk assessment score. Such behaviors may include, for example and without limitation, receiving requests from the client device 106 to access (e.g., copy) large numbers of files, detecting repeated attempts to access files restricted by the security policy, detecting attempts to defeat security measures, detecting changed network conditions such as the client device 106 moving to a less secure network, and/or detecting attempts to access the system 102 from devices associated with the user account other than the client device 106 that initiated the virtualized computing environment. The system 102 may cause the client device 106 to output an indication that the first file cannot currently be accessed using the virtual computing environment. The indication may include a dialog or pop-up, and/or may include a visual modification of the icon representing the file.

In some implementations, the security policy may indicate read-only access of a file or folder. The system 102 may receive, from the client device 106, a request identifying a third file to be accessed. The system 102 may determine, based at least in part on the security policy, that the virtualized computing environment is currently prohibited from accessing the third file. The system 102 may cause the client device 106 to output an indication that the third file is available read-only. In some implementations, the indication may be a visual indicator associated with an icon representing the third file; for example, a padlock symbol such as the one superimposed over the second icon 130b in FIG. 1B.

The features described with respect to the example systems respectively illustrated in FIGS. 1A to 1C are not mutually exclusive and may be combined in various combinations without departing from the scope of the disclosure. Additional details and example implementations of embodiments of the present disclosure are set forth below in Section D, following a description of example systems and network environments in which such embodiments may be deployed.

B. Network and Computing Environment

Figure 2A:
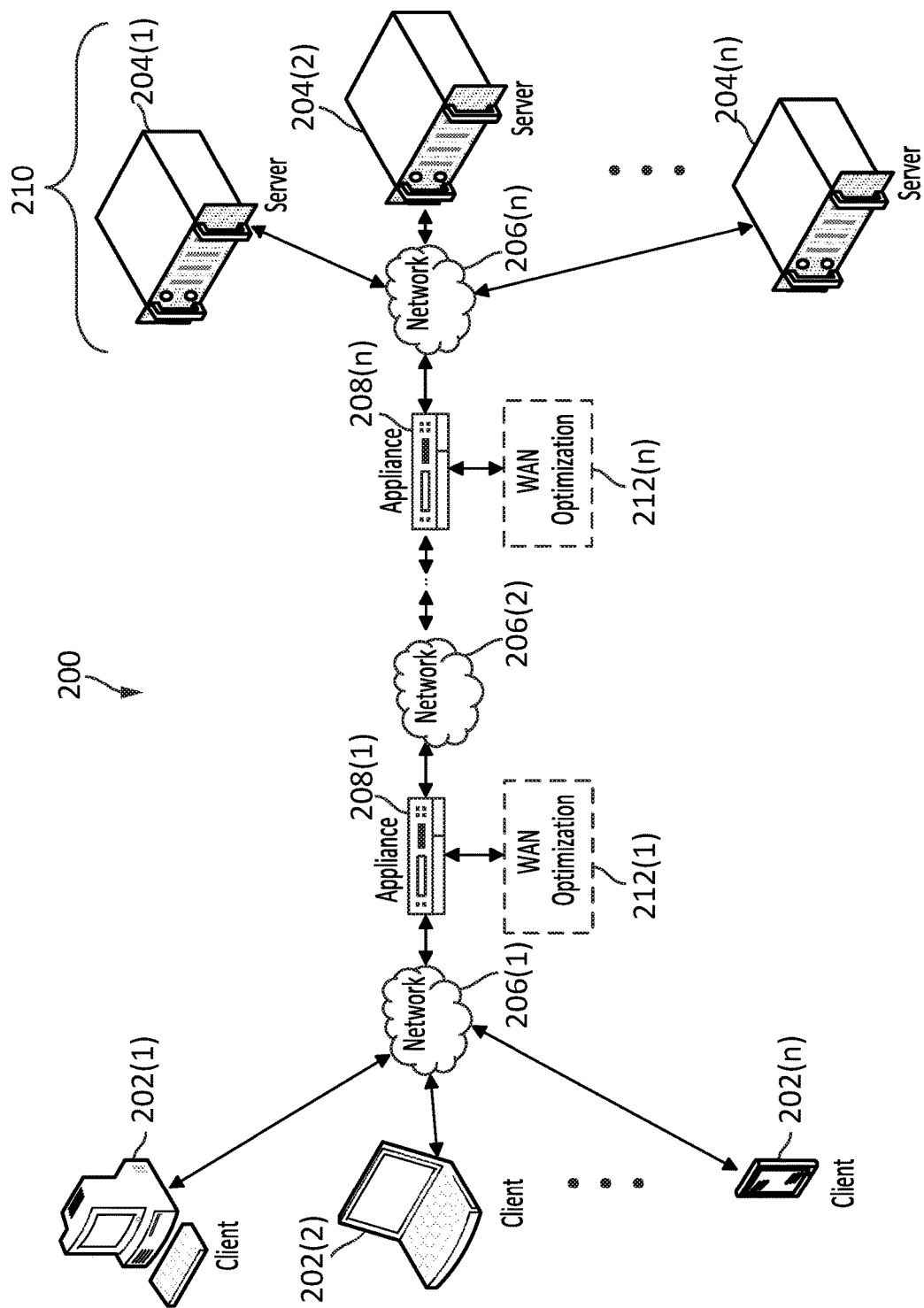
FIG. 2A is a diagram of a network computing environment.

FIG. 2A is a diagram of a network computing environment 200. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). The clients 202 can include, for example, the client device 106, and the servers 204 can, for example, include or make up the virtualization server system 102. In some embodiments, a client 202 may communicate with a server 204 via one or more appliances 208(1)-208(n) (generally referred to as appliance(s) 208 or gateway(s) 208).

Although the embodiment shown in FIG. 2A shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may each be a private network such as a local area network (LAN) or a company Intranet, while the network 206(2) may be a public network, such as a wide area network (WAN) or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 2A, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, each appliance 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more of the appliances 208 may be implemented as network devices sold by Citrix Systems, Inc., of Fort Lauderdale, Fla., such as Citrix Gateway™ or Citrix ADC™.

As shown in FIG. 2A, in some embodiments, groups of the servers 204 may operate as one or more server farms 210. The servers 204 of each such server farm 210 may be logically grouped, and may either be geographically co-located (e.g., on premises) or geographically dispersed (e.g., cloud based) from the clients 202 and/or other servers 204. In some embodiments, as explained in more detail below, one or more server farms 210 may execute one or more applications on behalf of one or more of clients 202 (e.g., as a virtualization server system) and/or may facilitate the sharing of files between the clients 202 (e.g., as a file sharing system), although other uses are possible, such as a file server, gateway server, proxy server, or other similar server uses. In some embodiments, two or more server farms 210 may communicate with one another, e.g., via respective appliances 208 connected to the network 206(2), to allow multiple server-based processes to interact with one another.

As also shown in FIG. 2A, in some embodiments, one or more of the appliances 208 may include, be replaced by, or be in communication with, one or more additional appliances, such as WAN optimization appliances 212(1)-212(n), referred to generally as WAN optimization appliance(s) 212. For example, each WAN optimization appliance 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

Figure 2B:
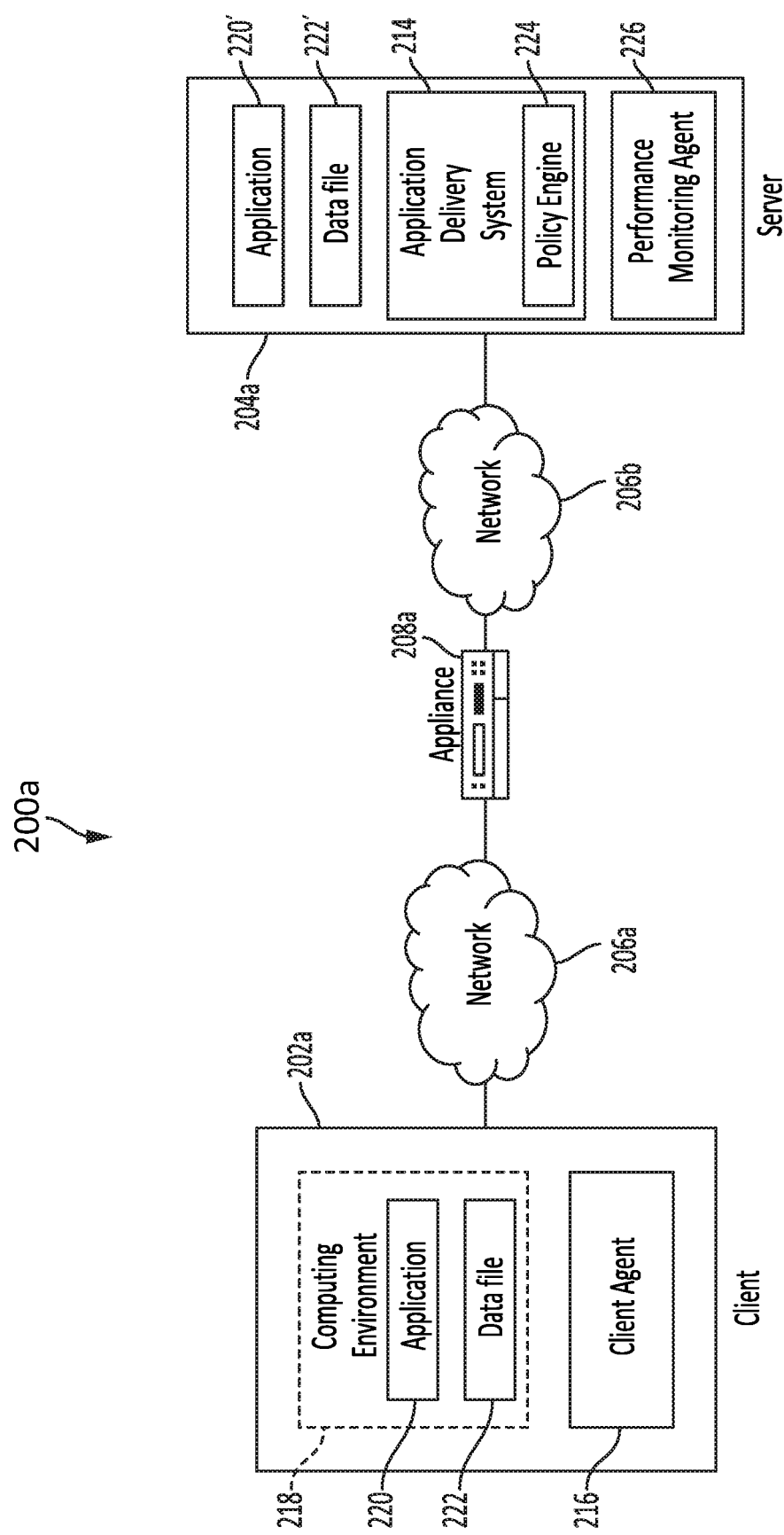
FIG. 2B is a diagram illustrating how a network computing environment like that shown in FIG. 2A may be configured to deliver a computing environment from a server to a client.

Referring to FIG. 2B, an example network environment 200a for delivering and/or operating a computing environment on a client 202a is shown. As shown in FIG. 2B, in some embodiments, a client 202a may include a computing environment 218, and a server 204a may include an application delivery system 214 for delivering a computing environment, application, and/or data files to one or more clients 202.

In some embodiments, each client 202 may additionally include a client agent 216 for establishing and exchanging communications with the appliance 208 and/or the server(s) 204 via a network 206. The client 202a may, for example, have installed and/or execute one or more applications that are in communication with the network 206a. In some embodiments, the client agent 216 may intercept network communications from a network stack used by the one or more applications. For example, the client agent 216 may intercept a network communication at any point in a network stack and redirect the network communication to a destination desired, managed, and/or controlled by the client agent 216, for example, to intercept and redirect a transport layer connection to an IP address and port controlled and/or managed by the client agent 216. The client agent 216 may thus, in some embodiments, transparently intercept any protocol layer below the transport layer, such as the network layer, and any protocol layer above the transport layer, such as the session, presentation, or application layers. The client agent 216 may, for example, interface with the transport layer to secure, optimize, accelerate, route, and/or load-balance any communications provided via any protocol carried by the transport layer.

In some embodiments, the client agent 216 may be implemented as an Independent Computing Architecture (ICA) client developed by Citrix Systems, Inc. The client agent 216 may perform acceleration, streaming, monitoring, and/or other operations. For example, the client agent 216 may accelerate streaming an application from the server 204a to the client 202a. The client agent 216 may also perform end-point detection/scanning and/or collect end-point information about the client 202a for the appliance 208a and/or the server 204a. The appliance 208a and/or the server 204a may use the collected information to determine and provide access, authentication, and/or authorization control of the client's connection to the network 206a. For example, the client agent 216 may identify and determine one or more client-side attributes, such as: the operating system and/or a version of an operating system, a service pack of the operating system, a running service, a running process, a file, presence or versions of various applications of the client, such as antivirus, firewall, security, and/or other software.

The computing environment 218 may, for example, execute or operate an application 220 that accesses, processes and/or uses a data file 222. The computing environment 218, application 220 and/or data file 222 may be delivered via an appliance 208a and/or the server 204a.

The appliance 208a may accelerate delivery of all or a portion of the computing environment 218 to the client 202a, for example by the application delivery system 214. For example, the appliance 208a may accelerate delivery of a streaming application 220' and data file 222' processable by the application 220 from a data center to a remote user location by accelerating transport layer traffic between the client 202a and the server 204a. Such acceleration may be provided by one or more techniques, such as: 1) transport layer connection pooling, 2) transport layer connection multiplexing, 3) transport control protocol buffering, 4) compression, 5) caching, and/or 6) redirecting traffic across a private network, or other techniques. The appliance 208a may also provide load balancing of servers 204 in a server farm 210 (shown in FIG. 2A) to process requests from the clients 202, act as a proxy or access server to provide access to the one or more servers 204, provide security and/or act as a firewall between the clients 202 and the servers 204, provide Domain Name Service (DNS) resolution, provide one or more virtual servers or virtual internet protocol servers, and/or provide secure virtual private network (VPN) connections from the clients 202 to the servers 204, such as a secure socket layer (SSL) VPN connection and/or provide encryption and decryption operations.

The application delivery system 214 may deliver the computing environment 218 to a user (e.g., client 202a), remote or otherwise, based on authentication and authorization policies applied by a policy engine 224. A remote user may obtain a computing environment and access to server stored applications 220' and data files 222' from any network-connected device (e.g., the client 202a). For example, the appliance 208a may request an application 220' and data file 222' from the server 204a. In response to the request, the application delivery system 214 and/or the server 204a may deliver the application 220' and data file 222' to the client 202a, for example via an application stream to operate in the computing environment 218 on the client 202a, or via a remote-display protocol or otherwise via remote-based or server-based computing. In an embodiment, application delivery system 214 may be implemented as any portion of the Citrix Workspace™ by Citrix Systems, Inc., of Fort Lauderdale, Fla., such as Citrix Virtual Apps and Desktops™.

The policy engine 224 may control and manage the access to, and execution and delivery of, applications. For example, the policy engine 224 may determine the one or more applications a user or client 202 may access and/or how the application should be delivered to the user or client 202, such as a server-based computing, streaming or delivering the application locally to the client 202 for local execution. The policy engine 224 may communicate with a policy administrator, such as the policy administrator 435 described below with reference to FIG. 4. The policy administrator may maintain additional policy information for users of the servers 204.

For example, in operation, the client 202a may request execution of an application (e.g., application 220') and the application delivery system 214 of the server 204a may determine how to execute the application 220', for example based upon credentials received from the client 202a and a user policy applied by the policy engine 224 associated with the credentials. For example, the application delivery system 214 may enable the client 202a to receive application-output data generated by execution of the application on the server 204a, may enable the client 202a to execute the application 220 locally after receiving the application from the server 204a, or may stream the application via one or more networks 206a, 206b to the client 202a. For example, in some embodiments, the application 220 may be a server-based or a remote-based application executed on the server 204*a* on behalf of the client 202*a*. The server 204*a* may display output to the client 202*a* using a thin-client or remote-display protocol, such as the Independent Computing Architecture (ICA) protocol by Citrix Systems, Inc. The application 220 may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

As shown, one or more servers 204 may also include a performance monitoring service or agent 226. In some embodiments, a dedicated one or more servers 204 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on one or more clients 202 (e.g., the client agent 216), one or more servers 204 (e.g., the agent 226) and/or one or more appliances 208 and/or 212 (agent not shown). In general, the monitoring agents (e.g., agent 216 and/or agent 226) may execute transparently (e.g., in the background) to any application and/or user of the device. In some embodiments, the monitoring agent 226 may be implemented as Citrix Analytics™ by Citrix Systems, Inc., of Fort Lauderdale, Fla.

The monitoring agents may, for example, monitor, measure, collect, and/or analyze data on a predetermined frequency, based upon an occurrence of given event(s), or in real time during operation of the network environment 200*a*. The monitoring agents may monitor resource consumption and/or performance of hardware, software, and/or communications resources of the clients 202, networks 206, appliances 208 and/or 212, and/or servers 204. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for the application delivery system 214. For example, based upon one or more monitored performance conditions or metrics, the application delivery system 214 may be dynamically adjusted, for example periodically or in real-time, to optimize application delivery by the servers 204 to the clients 202 based upon network environment performance and conditions.

In the described embodiments, the clients 202, servers 204, and appliances 208 and/or 212 (appliances 212 are shown in FIG. 2A) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may each correspond to one computer, a plurality of computers, or a network of distributed computers such as computer 246 shown in FIG. 2C.

Figure 2C:
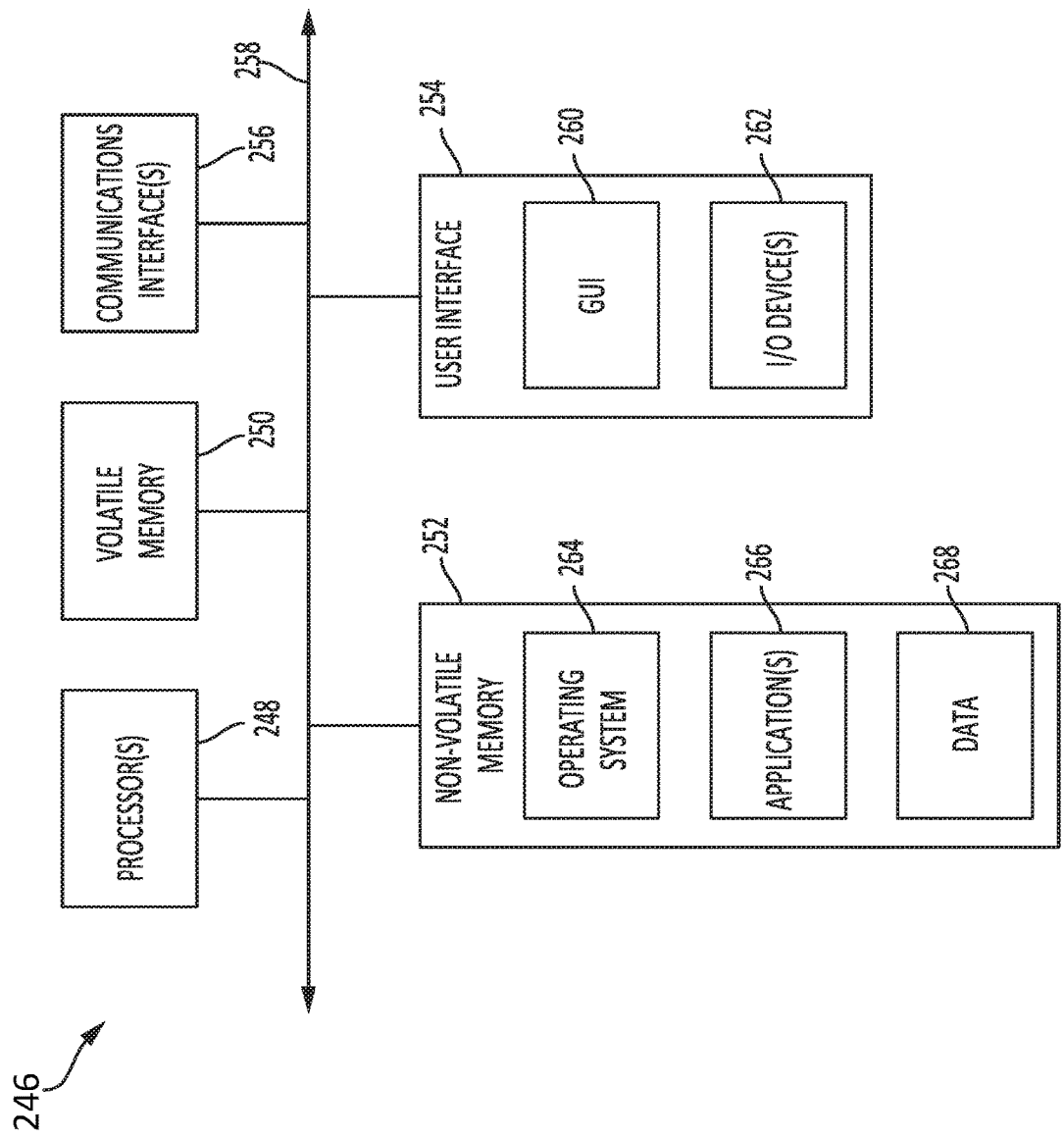
FIG. 2C is a block diagram of a computing device that may be used to implement one or more of the components of the computing environment shown in FIGS. 2A-B.

As shown in FIG. 2C, the computer 246 may include one or more processors 248, volatile memory 250 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, etc.) and one or more input/output (I/O) devices 262 (e.g., a mouse, a keyboard, etc.). The non-volatile memory 252 may store an operating system 264, one or more applications 266, and data 268 such that, for example, computer instructions of the operating system 264 and/or applications 266 are executed by the processor(s) 248 out of the volatile memory 250. Data may be entered using an input device of the GUI 260 or received from I/O device(s) 262. Various elements of the computer 246 may communicate via the communication bus 258. The computer 246 as shown in FIG. 2C is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" may be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 256 may include one or more interfaces to enable the computer 246 to access a computer network such as a LAN, a WAN, or the Internet through a variety of wired and/or wireless or cellular connections.

As noted above, in some embodiments, one or more computers 246 may execute an application on behalf of a user of a client computing device (e.g., a client 202), may execute a virtual machine, which provides an execution session within which applications execute on behalf of a user or a client computing device (e.g., a client 202), such as a hosted desktop session, may execute a terminal services session to provide a hosted desktop environment, or may provide access to a computing environment including one or more of: one or more applications, one or more desktop applications, and one or more desktop sessions in which one or more applications may execute.

C. High-Level Architecture of a Desktop Virtualization System

Figure 3:
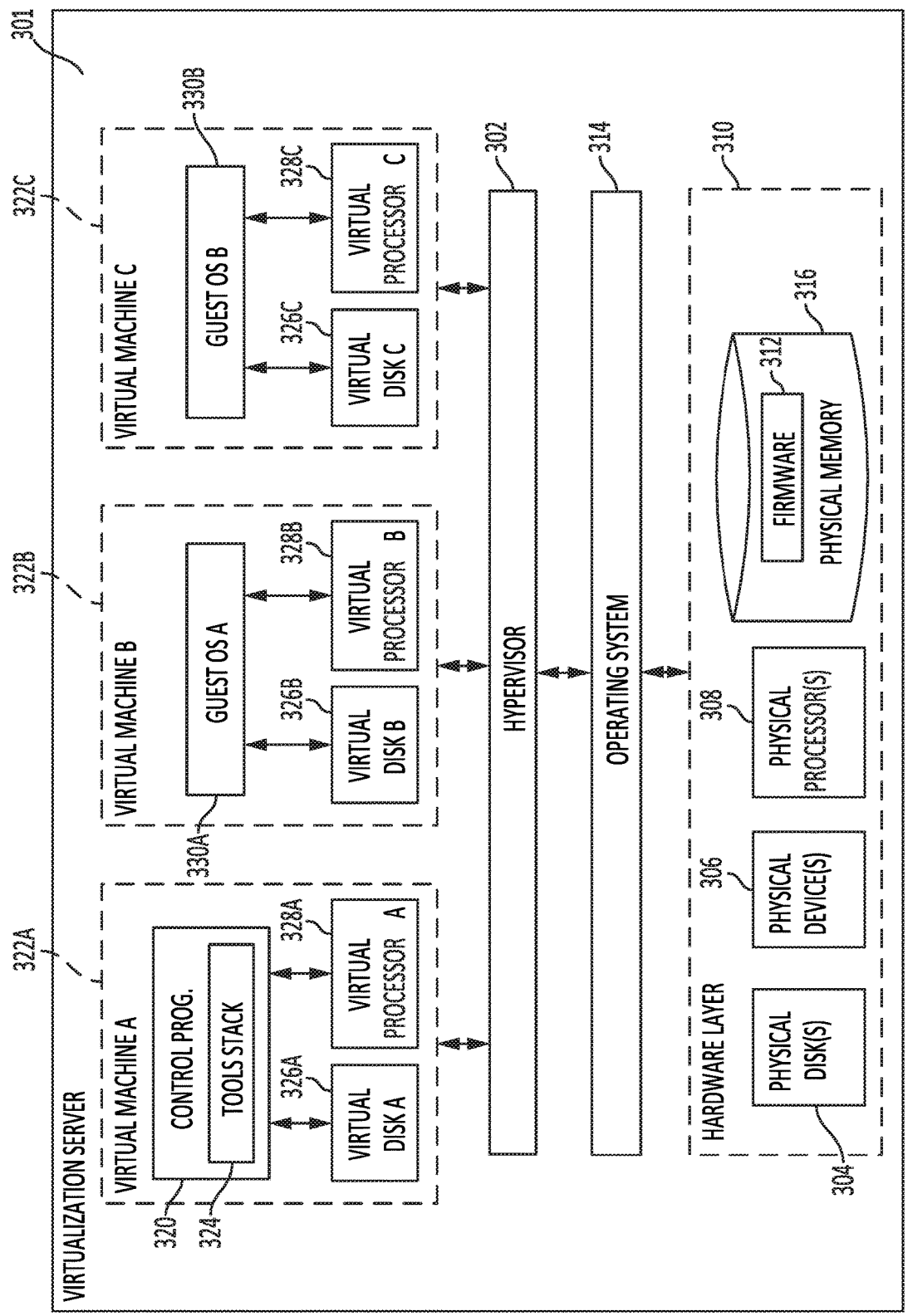
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be a single-server or multi-server system, or a cloud system, including at least one virtualization server 301 configured to provide virtual desktops and/or virtual applications to one or more client access devices, such as the clients 202 and the client device 106. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Computer device 301 may be configured as a virtualization server in a virtualization environment, for example, a single-server, multi-server, or cloud computing environment. Virtualization server 301 illustrated in FIG. 3 may be deployed as and/or implemented by one or more embodiments of the servers 204, the servers that make up the virtualization server system 102, or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type 1 hypervisor; that is, a bare-metal hypervisor installed directly on the hardware layer 310. In some implementations, the hypervisor 302 may be a Type 2 hypervisor, which executes on a host operating system, such as the OS 314, which may provide virtualization services such as I/O device support and memory management.

Executing on one or more of physical processors 308 may be one or more virtual machines 322A-C (generally 322). Each virtual machine 322 may have virtual disk 326A-C and virtual processor 328A-C. In some embodiments, first virtual machine 322A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 322B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 3 illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 322. Hypervisor 302 may be referred to as a virtual machine monitor, or platform virtualization software. In some embodiments, hypervisor 302 may be any combination of executable instructions and hardware that monitors virtual machines 322 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 322 in any manner that simulates operating systems 330 or control programs 320 having direct access to system resources. System resources may include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 322 executing on virtualization server 301. Examples of hypervisor 302 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. In some embodiments, virtualization server 301 may execute hypervisor 302 that creates a virtual machine platform on which guest operating systems 330 may execute. In these embodiments, virtualization server 301 may be referred to as a host server. An example of such a virtualization server is Citrix Hypervisor® provided by Citrix Systems, Inc., of Fort Lauderdale, Fla.

Hypervisor 302 may create one or more virtual machines 322B-C (generally 322) in which guest operating systems 330 execute. In some embodiments, hypervisor 302 may load a virtual machine image to create virtual machine 322. The virtual machine image may refer to a collection of data, states, instructions, etc. that make up an instance of a virtual machine. In other embodiments, hypervisor 302 may execute guest operating system 330 within virtual machine 322. In still other embodiments, virtual machine 322 may execute guest operating system 330. A filter driver, such as the file system filter driver 420 described below with reference to FIG. 4, can be installed into the guest OS 330 for logging, observing, modifying, and/or preventing I/O operations pertaining to accessing files and folders on the server 301 as described herein.

In addition to creating virtual machines 322, hypervisor 302 may control the execution of at least one virtual machine 322. In other embodiments, hypervisor 302 may present at least one virtual machine 322 with an abstraction of at least one hardware resource provided by virtualization server 301 (e.g., any hardware resource available within hardware layer 310). In other embodiments, hypervisor 302 may control the manner in which virtual machines 322 access physical processors 308 available in virtualization server 301. Controlling access to physical processors 308 may include determining whether virtual machine 322 should have access to processor 308, and how physical processor capabilities are presented to virtual machine 322.

As shown in FIG. 3, virtualization server 301 may host or execute one or more virtual machines 322. Virtual machine 322 may be a set of executable instructions and/or user data that, when executed by processor 308, may imitate the operation of a physical computer such that virtual machine 322 may execute programs and processes much like a physical computing device. While FIG. 3 illustrates an embodiment where virtualization server 301 hosts three virtual machines 322, in other embodiments virtualization server 301 may host any number of virtual machines 322. Hypervisor 302, in some embodiments, may provide each virtual machine 322 with a unique virtual view of the physical hardware, including memory 316, processor 308, and other system resources 304, 306 available to that virtual machine 322. In some embodiments, the unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 322 and one or more secure virtual machines 322. Unsecure virtual machines 322 may be prevented from accessing resources, hardware, memory locations, and programs that secure virtual machines 322 may be permitted to access. In other embodiments, hypervisor 302 may provide each virtual machine 322 with a substantially similar virtual view of the physical hardware, memory, processor, and other system resources available to virtual machines 322.

Each virtual machine 322 may include virtual disk 326A-C (generally 326) and virtual processor 328A-C (generally 328.) Virtual disk 326, in some embodiments, may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 322 with a unique view of physical disks 304. Thus, in these embodiments, particular virtual disk 326 included in each virtual machine 322 may be unique when compared with other virtual disks 326.

Virtual processor 328 may be a virtualized view of one or more physical processors 308 of virtualization server 301. In some embodiments, the virtualized view of physical processors 308 may be generated, provided, and managed by hypervisor 302. In some embodiments, virtual processor 328 may have substantially all of the same characteristics of at least one physical processor 308. In other embodiments, virtual processor 308 may provide a modified view of physical processors 308 such that at least some of the characteristics of virtual processor 328 are different from the characteristics of the corresponding physical processor 308.

Figure 4:
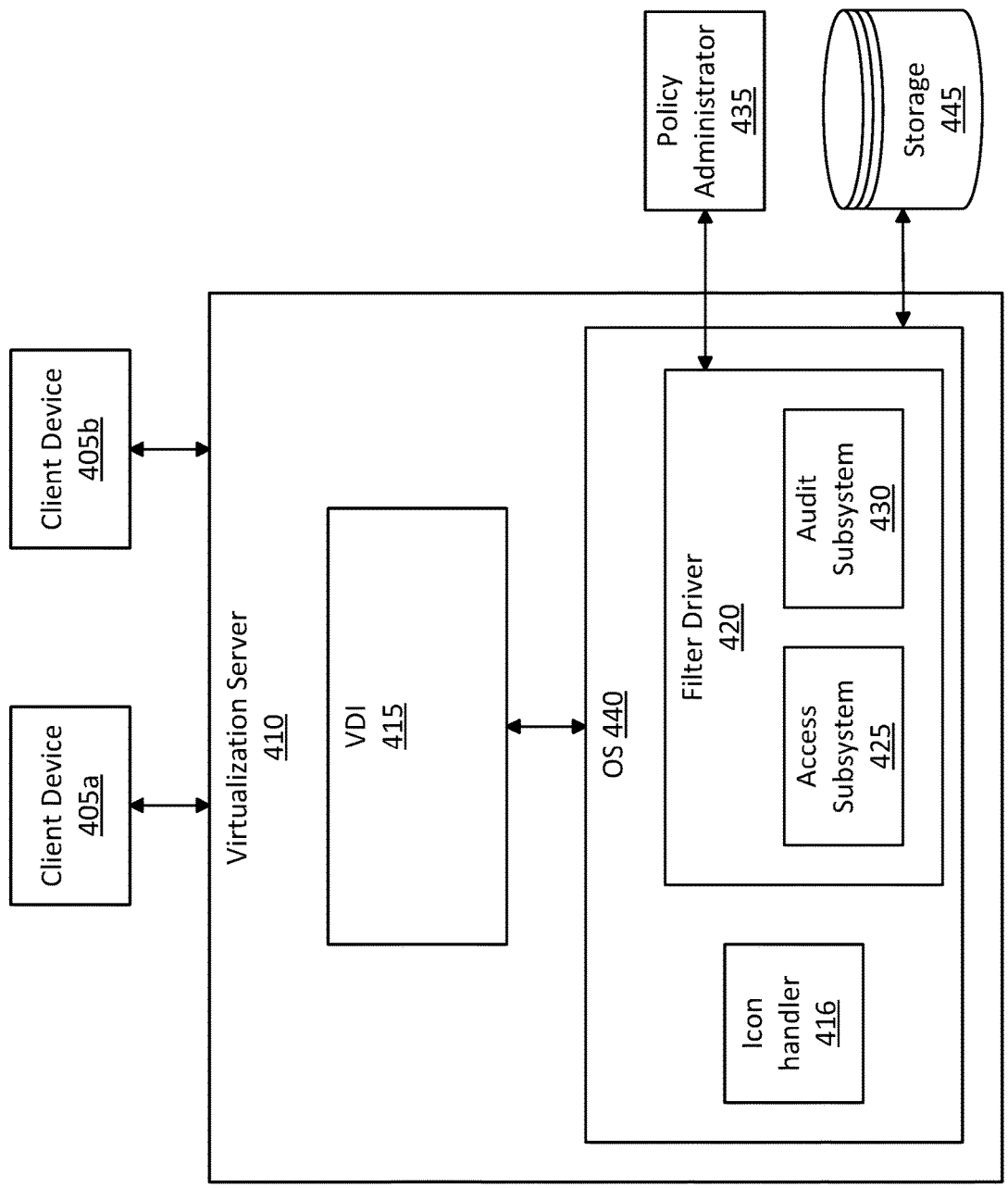
FIG. 4 shows an example embodiment of a virtualization server system configured in accordance with the present disclosure.

D. Detailed Description of Example Embodiments of a Virtualization Server System FIG. 4 shows an example embodiment of a virtualization server 410 illustrating various aspects of a desktop virtualization system and configured in accordance with the present disclosure. Certain components and functions of the virtualization server 410 may correspond to components and functions of the virtualization server 301. The virtualization server system 102 previously described may be made up of one or more servers 410. As shown in FIG. 4, the server 410 may interact with one or more client device 405a and 405b (collectively, "client devices 405"), such as the client device 106 previously described. In some embodiments, each of the client devices 106, 405 may correspond to one of the clients 202, and the virtualization server system 102 may correspond to one or more of the servers 204, or one or more servers that operate in conjunction with one or more of the servers 204, that are described above in connection with FIGS. 2 and 3. As shown, the server 410 may include virtual delivery infrastructure (VDI) 415 and an operating system (OS) 440, such as the guest OS 330 previously described. The OS 440 may include an icon handler 416, and a file system filter driver 420 having an access subsystem 425 and an audit subsystem 430. In some implementations, the filter driver 420 may be in communication with a policy administrator 435. The filter driver 420 can monitor and manage operations relating to files and folders stored in a storage medium 445. In some implementations, the server 410 may include additional components or fewer components as those shown in FIG. 4, the server 410 may divide functions differently among the components, or divide the components between one or more physical devices.

The virtual delivery infrastructure (VDI) 415 may include a program or programs executing on the hardware resources of the server 410 to provide desktop virtualization services to the client devices 405. In some implementations, the VDI 415 can execute in a virtual machine, such as the virtual machine 322. The services may include applications such as document creation applications, web browsers, email applications, and the like. The VDI 415 can facilitate the client device 405 access to files and folders stored in the storage 445, subject to the oversight of the filter driver 420. An example virtual delivery infrastructure implementation is the Citrix Virtual Delivery Agent.

The operating system (OS) 440 may include software that supports the server's 410 basic functions. The OS 440 may, for example, manage software resources such as scheduling, and hardware resources such as memory allocation, input and output, and peripheral devices. The OS 440 may also control access to files and folders on the system, including those stored in the storage 445. The OS 440 may be a guest OS executing within the virtual machine. The OS 440 may handle file permissions and access for the VDI 415. The permissions may be superseded by the filter driver 420.

The file system filter driver 420 may be a program or module inserted into the driver stack of the OS 440 to filter input and output requests for a device, a class of devices, and/or a bus, and to provide modifications or enhancements to the behavior of an input or output device. The filter driver 420 may include the access subsystem 425 and the audit subsystem 430. The access subsystem 425 may maintain the security policies and, in some implementations risk scores, for each virtualized computing session. The audit subsystem 430 may maintain a log of activity within each virtualized computing session, such as requests to access files and folders and, in some implementations, other behavioral indicators affecting risk scores.

The policy administrator 435 may maintain global security policies as well as policy information for individual users of the system, such as a risk assessment score and file policies for a given user. Such file policies may supplement or supplant the security policies embodied in the session token. If the policy administrator 435 is unreachable, however, the filter driver 420 may default to the security policies received from the client device 405 at the start of the virtualization session, for example in the session token, or fallback to the last previous security policy established for the user account or the client device 405.

In some implementations, the OS 440 may include an icon handler 416. The icon handler 416 may be a component of the display system of the OS 440. The icon handler 416 may manipulate the icons of files and folders that are filtered by the file system filter driver. The icon handler 416 may, for example, be responsible for the overlaying of a custom graphical icon on top of the file or folder's icon in a file explorer window that represents the current restrictions applicable to said file or folder based on the user's current perceived security. An example of such a restriction would be to show the user at a glance that they cannot open a file or folder due to their perceived security risk by overlaying a red X graphic on top of the item's icon. If no overlay were present the user would have to attempt to open each file individually to determine whether they have access in their current session, or the filter driver 420 would have to hide the files and folders that the user cannot temporarily access, a method which would cause confusion to the user as the user may mistake this for those items having been moved or deleted. Both of these alternatives would provide a poor user experience.

The storage medium 445 may include or be included in a memory or storage device of the server 410. The storage medium 445 may host the files and folders for access by the client devices 405. The storage medium 445 may further store state information of the server 410, such as state information relating to virtualized computing sessions. The storage medium 445 may additionally store executable computer code for performing the functions of the server 410 described herein, including the functions executed by the individual components. The storage medium 445 may include multiple physical storage components such as memory banks or hard drives. The storage medium 445 may be internal to the hardware of the server 410, may be external to and separate from the server 410, or may exist on a separate server in communication with the server 410 and possibly additional servers.

Figure 5:
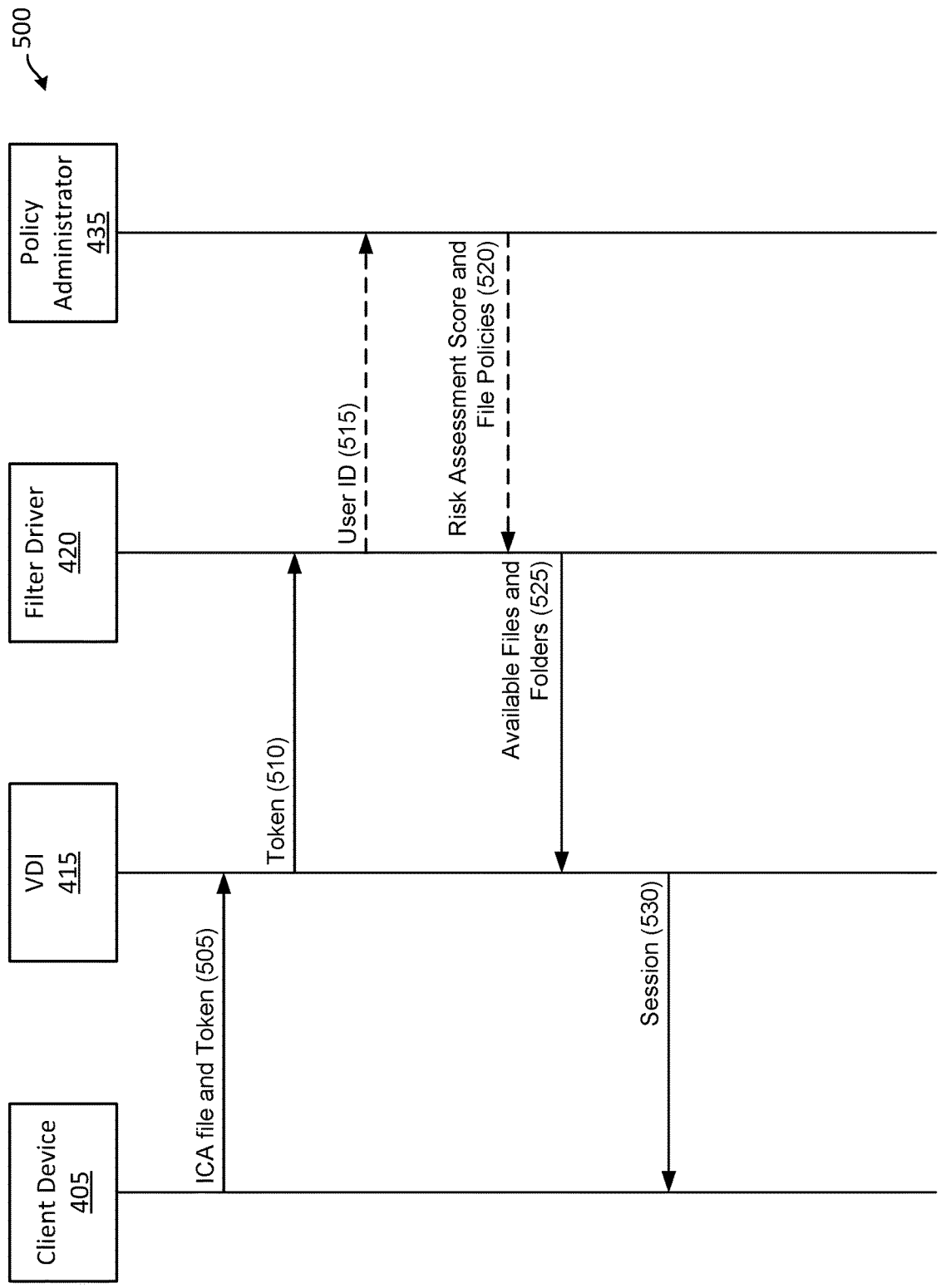
FIG. 5 shows an example signal diagram according to an embodiment of the virtualization server system shown in FIG. 4.

FIG. 5 shows an example signal diagram 500 illustrating messages that may be exchanged amongst the client device 405 and certain components of the virtualization server system shown in FIG. 4. In particular, FIG. 5 shows operations that may occur between the client device 405, the virtual delivery infrastructure (VDI) 415, the file system filter driver 420, and the policy administrator 435. The signal diagram 500 shows a sample initialization sequence for a virtualization session.

As shown in the signal diagram 500, the client device 405 may seek to begin a virtualized computing session. At a step 505, the client device 405 may request commencement of the virtualized computing session by sending an Independent Computing Architecture (ICA) file and session token to the VDI 415. In some implementations, the ICA file and the session token can be embodied by, or contained within, a single file. The client device 405 may present to the VDI 415 an ICA file for launching the session along with a session token that corresponds to, or contains, the security policies applicable to the session. In some implementation, the client device 405 may additionally provide credentials for the user of the client device 405, such as a user identifier and possibly a password, which can be hashed or encrypted for security purposes.

At a step 510, the VDI 415 may forward the session token to the filter driver 420, which can use the session token to set initial permissions for the virtualized computing session.

In some implementations, at a step 515, the filter driver 410 may send a user identifier (ID) of a user account associated with the virtualized computing session to the policy administrator 435. At a step 520, the policy administrator 435 may return a risk assessment score and/or file policies corresponding to the user ID. In turn, the filter driver 420 may attempt to communicate with policy administrator 435 to determine a risk assessment score associated with the user account and the file policies to apply based on the risk score. If the policy administrator 435 is unreachable, however, the filter driver 420 may fall back onto the policies defined by the session token.

At a step 525, the filter driver 420, in response to receiving the session token, may indicate to the VDI 415 the files and folders available within the virtualized computing environment.

At a step 530, the VDI 415 may commence the virtualized computing session and provide the virtualized computing environment to the client device 405.

In some implementations, an icon handler 416 may provide indications of levels of authorization the client device 405 may have to different files or folders. For example, the icon handler may be initialized with the session token and determine the file policies applicable to the user account associated with the virtualized computing session. The icon handler may modify the rendered icons, as shown in FIG. 1B described above, to display the current status of the files and folders for the virtualized computing session based on a perceived security risk. The icon 130*c* may be the default with no restrictions, the icon 130*a* may represent a file or folder not accessible to the user, and the icon 130*b* may represent a file or folder available read-only.

In some embodiments, the implementation of how the filter driver 420 and icon handler 416 communicate with policy administrator 435 may be different. It is possible, for example, that instead of communicating with policy administrator 435 directly, the VDI 415 and icon handler 416 may communicate with an agent running on the VDI 415 itself. The filter driver 420 and icon handler 416 may also communicate with each other to better facilitate their operational requirements.

Figure 6A:
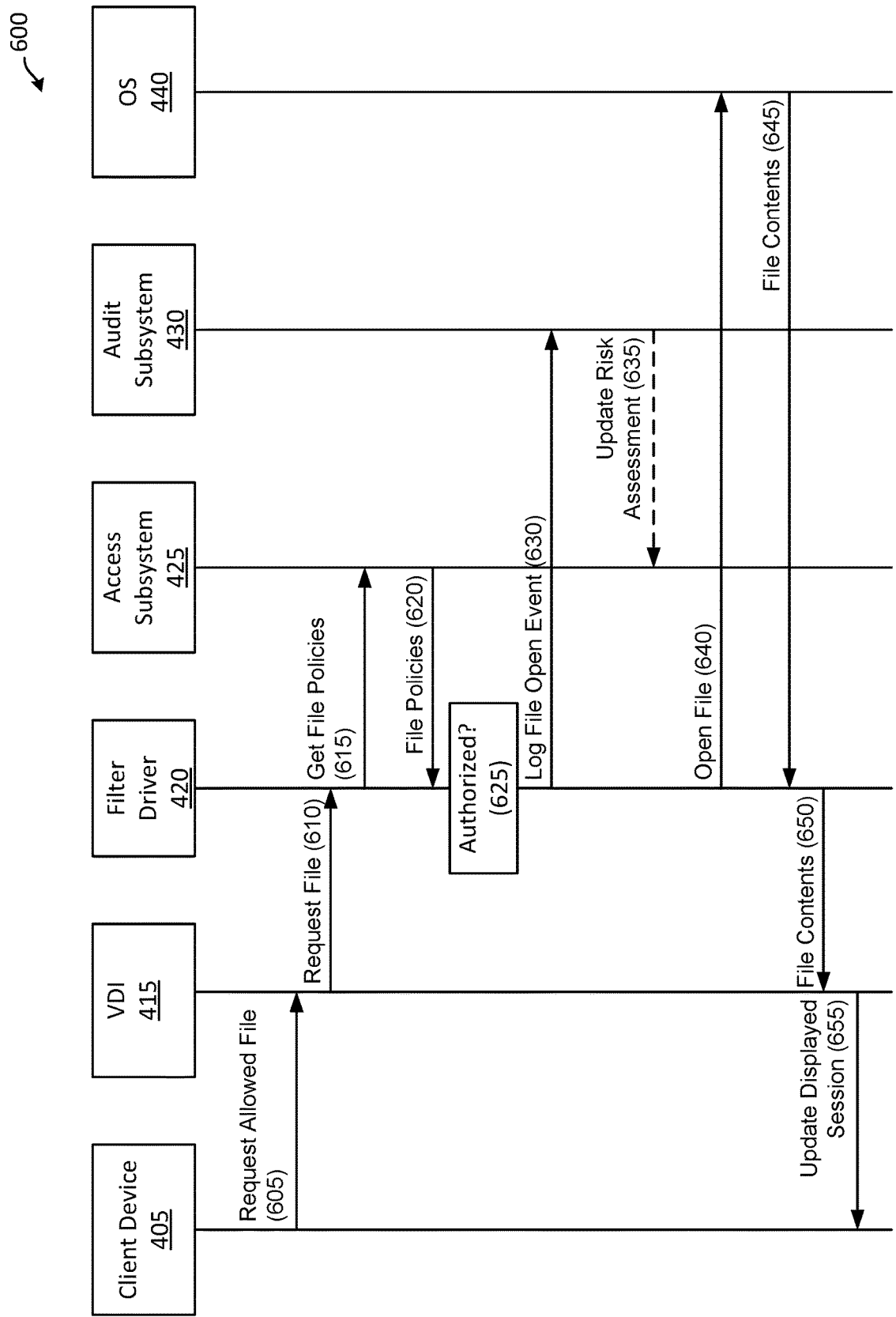
FIG. 6A shows an example signal diagram according to an embodiment of the virtualization server system shown in FIG. 4.

FIG. 6A shows an example signal diagram 600 illustrating messages that may be exchanged amongst the client device 405 and certain components of the virtualization server system shown in FIG. 4. In particular, FIG. 6A shows operations that may occur between the client device 405, the virtual delivery infrastructure (VDI) 415, the filter driver 420, the access subsystem 425, the audit subsystem 430, and the OS 440. The signal diagram 600 illustrates events that may occur when the client device 405 seeks access to a file or folder to which it has authorization to access in the virtualized computing environment. In contrast, the signal diagram 601, discussed below with reference to FIG. 6B, describes an example of handling of a user attempt to access a file or folder to which the user does not have authorization to access. For both operations, the filter driver 420 may determine the applicable file policies for the requested file using its access subsystem 425, and may log the event to its audit subsystem 430 for security assessment evaluation and auditing purposes. After initialization, the filter driver 420 may monitor the I/O operations of the VDI 415 and observe and/or intercept the operations as needed in accordance with the defined security policies.

As shown in the signal diagram 600, a user may attempt to open a file or folder to which the user has authorization to access. At a step 605, the client device 405 may transmit to the VDI 415 a request to access a file or folder. At a step 610, the filter driver 420 may intercept the request.

At a step 615, the filter driver 420 may request one or more file policies from the access subsystem 425. At a step 620, the access subsystem 425 may return the requested file policies to the filter driver 420.

At a step 625, after the access subsystem 425 has returned the relevant file policies, the filter driver 420 may determine that the client device 405 has authorization to access the file.

At a step 630, the filter driver 420 may send data regarding the file open event to the audit subsystem 430. The audit subsystem 430 may maintain a log of access requests and grants. In some implementations, the audit subsystem 430 may maintain a risk assessment, such as a risk score. At a step 635, the audit subsystem 430 may update the access subsystem 425 with a new risk assessment. Where subsequent requests for access depend on a risk score, the access subsystem 425 may respond according to the new risk score, rejecting access where appropriate. The auditing subsystem 430 may determine that the event, such as part of the history of the user's action within the session, warrants changing the risk assessment score of the user and may update the access subsystem with that information. For example, if the system 102 receives requests from the client device 106 to access (e.g., copy) large numbers of files, repeated attempts to access files restricted by the security policy, attempts to defeat security measures, changing network conditions such as moving to a less secure network, and/or attempts to access the system 102 from devices associated with the user account other than the client device 106 that initiated the virtualized computing environment, such behaviors may lead to an increased risk score. In addition, the audit subsystem 430 of the filter driver 420 may report the audit events it stores to the auditing system on the VDI 415 for the administrator to later review, and may also send these events to a policy administrator, such as the policy administrator 435, for analysis of the user's risk assessment score that spans multiple sessions. This reporting may be done both as a recurring periodic process and at the close of the user's session, as it might otherwise interfere with the performance of the I/O operations the filter driver 420 is monitoring.

At a step 640, after the filter driver has determined that the client device 405 has authorization to access the file, the filter driver 420 may forward the request to the OS 440. (For other operations, such as querying for available files in a folder, the filter driver 420 may also modify the request to the OS 440; for example, to prevent the OS from returning data regarding the contents of files and folders for which the client device 405 does not have authorization to access.)

At a step 645, the OS 440 may return the file contents to the filter driver 420. At a step 650, the filter driver 420 allows the file contents to pass to the VDI. The OS 440 may allocate a memory block to an application executing within the VDI 415. To make a file read request, the application may pass a pointer to a portion of the memory block to the OS 440. If permission to access the file is granted, the OS 440 can populate the memory block with the requested data.

At a step 655, the VDI 415 may output a representation of contents of the first file or folder using the virtualized computing environment displayed on the client device 405.

Figure 6B:
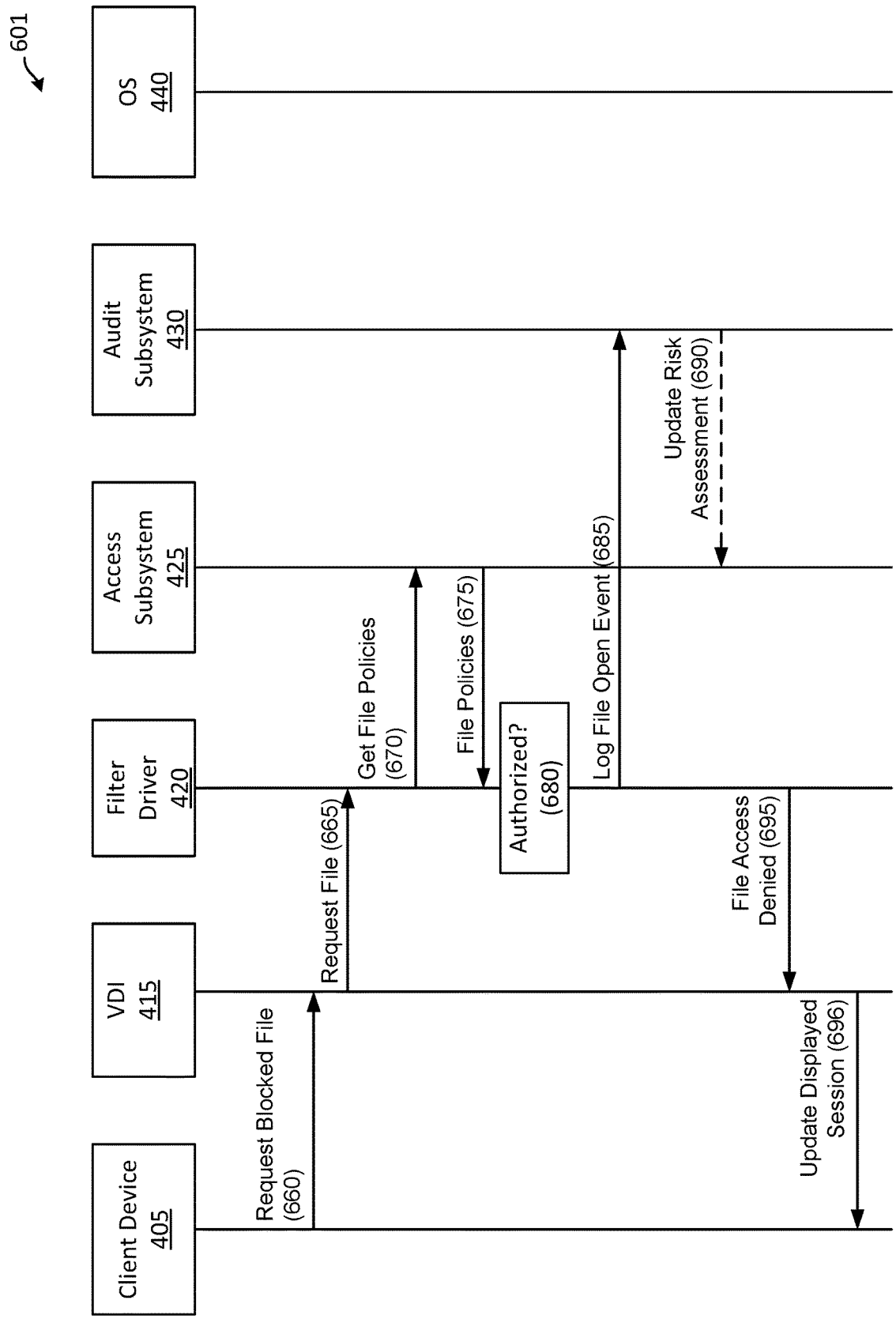
FIG. 6B shows an example signal diagram according to an embodiment of the virtualization server system shown in FIG. 4.

FIG. 6B shows an example signal diagram 601 illustrating messages that may be exchanged amongst the client device 405 and certain components of the virtualization server system shown in FIG. 4. In particular, FIG. 6B shows operations that occur between the client device 405, the virtual delivery infrastructure (VDI) 415, the filter driver 420, the access subsystem 425, the audit subsystem 430, and the OS 440. The signal diagram 601 illustrates events that may occur when the client device 405 seeks access to a file or folder for which it lacks authorization to access in the virtualized computing environment.

At a step 660, the client device 405 may transmit to the VDI 415 a request to access a file or folder. At a step 665, the filter driver 420 may intercept the request.

At a step 670, the filter driver 420 may request one or more file policies from the access subsystem 425. At a step 675, the access subsystem 425 may return the requested file policies to the filter driver 420.

At a step 680, after the access subsystem 425 has returned the relevant file policies, the filter driver 420 may determine that the client device 405 lacks authorization to access the file.

At a step 685, the filter driver 420 may send data regarding the file open event to the audit subsystem 430. The audit subsystem 430 may maintain a log of access requests and grants. In some implementations, the audit subsystem 430 may maintain a risk assessment, such as a risk score. At a step 690, the audit subsystem 430 may update the access subsystem 425 with a new risk assessment. For example, the access subsystem 425 may increase a value of the risk score if the client device 405 or another device associated with the user account requests access to a file or folder for which it lacks authorization to access. Where subsequent requests for access depend on a risk score, the access subsystem 425 may respond according to the new risk score, granting or rejecting access where appropriate.

At a step 695, after filter driver 420 has determined that the client device 405 lacks authorization to access the file, the filter driver 420 may return an indication to the VDI 415 that the authorization for the client device 405 to access the file or folder has been denied.

At a step 696, the VDI 415 may update the displayed virtual computing session with an indication that the client device 405 currently lacks authorization to access the file or folder.

E. Example Implementations of Methods, Systems, and Computer-Readable Media in Accordance with the Present Disclosure The following paragraphs (M1) through (M24) describe examples of methods that may be implemented in accordance with the present disclosure.

(M1) A method performed by at least one computing device may involve providing a virtualized computing environment associated with a user account to a client device, receiving a first request identifying a first file or folder to be accessed using the virtualized computing environment from the client device, and intercepting the first request by a file system filter driver. The file system filter driver determines, based at least in part on a security policy associated with the user account, that the virtualized computing environment is authorized to access the first file or folder. The client device is caused to output a representation of contents of the first file or folder using the virtualized computing environment.

(M2) A method may be performed as described in paragraph (M1), and may further involve receiving a second request to access a second file or folder from the client device, determining that the virtualized computing environment is not authorized to access the second file or folder, and causing the client device to output an indication that the second file or folder cannot currently be accessed using the virtual computing environment.

(M3) A method may be performed as described in paragraph (M2), and may further involve causing the client device to output a representation of the second file or folder together with an indication that the second file or folder cannot currently be accessed using the virtual computing environment.

(M4) A method may be performed as described in paragraphs (M2) or (M3), and may further involve receiving a third request to access a third file or folder, determining that the virtualized computing environment is authorized for read-only access of the third file or folder, and causing the client device to output a representation of contents of the third file or folder using the virtualized computing environment.

(M5) A method may be performed as described in paragraph (M4), and may further involve causing the client device to output a representation of contents of the third file or folder together with an indication that the third file or folder can currently be accessed as read-only.

(M6) A method may be performed as described in paragraphs (M4) through (M5), and may further involve receiving a fourth request to modify contents of the third file folder, and denying, based on the determination that the virtualized computing environment is authorized for read-only access of the third file folder, the fourth request.

(M7) A method may be performed as described in paragraph (M1), and may further involve receiving a third request to access a first file in a first file folder from the client device, determining that the virtualized computing environment is authorized to access the first file based on the security policy and the identifier, causing the client device to output a representation of contents of the first file using the virtualized computing environment, receiving a fourth request to access a second file in the first file folder, determining that the virtualized computing environment is not authorized to access the second file based on the security policy and the identifier, and causing the client device to output an indication that the second file cannot currently be accessed using the virtual computing environment.

(M8) A method may be performed as described in paragraph (M1), wherein the security policy specifies a first condition for accessing the first file or folder, the method may further involve calculating a first value of a risk score associated with the user account, and wherein determining that the virtualized computing environment is authorized to access the first file or folder includes determining that the first value of the risk score satisfies the first condition.

(M9) A method may be performed as described in paragraph (M8), wherein the security policy specifies a second condition for accessing the second file or folder, and the method further includes determining that the virtualized computing environment is not authorized to access the second file or folder includes determining that the first value of the risk score does not satisfy the second condition.

(M10) A method may be performed as described in paragraphs (M8) or (M9), and may further involve calculating a second value of the risk score based on a detected behavior associated with the user account, receiving a third request to access the first file or folder, determining that the virtualized computing environment is not authorized to access the first file folder based on the second value failing to satisfy the first condition, and causing the client device to output an indication that the first file or folder cannot currently be accessed using the virtual computing environment.

(M11) A method may be performed as described in paragraph (M1), and may further involve receiving, prior to an initiation of a virtual computing session, the security policy from the client device.

(M12) A method performed by at least one computing device may involve providing a virtualized computing environment associated with a user account to a client device, determining that a first icon corresponding to a first file or folder is to be presented on a display of the client device using the virtualized computing environment, determining that the virtualized computing environment currently is not authorized to access the first file or folder based at least in part on a security policy associated with the user account, and causing the client device to display the first icon together with an indication that the first file or folder cannot currently be accessed using the virtual computing environment.

(M13) A method may be performed as described in paragraph (M12), and may further involve receiving a first request to access the first file or folder from the client device, intercepting the first request by a file system filter driver, and denying the first request based on the determination that the virtualized computing environment is not authorized to access of the first file or folder.

(M14) A method may be performed as described in paragraphs (M12) or (M13), and may further involve determining that a second icon corresponding to a second file or folder is to be presented on the display, determining that the virtualized computing environment is authorized for read-only access of the second file or folder, and causing the client device to display the second icon together with an indication that the second file or folder can be accessed as read-only using the virtual computing environment.

(M15) A method may be performed as described in paragraph (M14), and may further involve receiving a first request to modify the second file or folder from the client device, intercepting the first request by a file system filter driver, and denying the first request to modify the second file or folder based on the determination that the virtualized computing environment is authorized for read-only access of the first file or folder.

(M16) A method may be performed as described in paragraph (M12), and may further involve determining that a second icon corresponding to a second file or folder is to be presented on the display, determining that the virtualized computing environment currently is authorized to access the second file or folder, and causing the client device to display the second icon together with an indication that the second file or folder can currently be accessed using the virtual computing environment.

(M16) A method may be performed as described in paragraph (M12), and may further involve, subsequent to causing the client device to display the second icon together with an indication that the second file or folder can currently be accessed, determining that authorization to access the second file or folder should be revoked based at least in part on the security policy and a behavior of the client device, and causing the client device to output an indication that the second file or folder cannot currently be accessed using the virtual computing environment.

(M18) A method performed by at least one computing device may involve providing a virtualized computing environment associated with a user account to a client device, receiving a first request identifying a first file to be accessed using the virtualized computing environment from the client device where the first file is located within a folder, determining that the virtualized computing environment is authorized to access the first file based at least in part on a security policy associated with the user account, causing the client device to output a representation of contents of the first file using the virtualized computing environment, receiving a second request identifying a second file to be accessed using the virtualized computing environment from the client device where the second file is also located within the folder, determining that the virtualized computing environment is not authorized to access the second file based at least in part on the security policy, and causing the client device to output an indication that the second file cannot currently be accessed using the virtual computing environment.

(M19) A method may be performed as described in paragraph (M18), and may further involve, subsequent to causing the client device to output a representation of contents of the first file, determining that authorization to access to the first file should be revoked based at least in part on the security policy and a behavior of the client device, and causing the client device to output an indication that the first file cannot currently be accessed using the virtual computing environment.

(M20) A method may be performed as described in paragraphs (M18) or (M19), and may further involve receiving a third request identifying a third file to be accessed from the client device, determining that the virtualized computing environment is authorized for read-only access of the third file based at least in part on the security policy, and causing the client device to output an indication that the third file is available read-only.

(S1) A system may include at least one processor and at least one computer-readable medium encoded with instructions which, when executed by the at least one processor, cause the system to provide a virtualized computing environment associated with a user account to a client device, receive a first request identifying a first file or folder to be accessed using the virtualized computing environment from the client device, and intercept the first request by a file system filter driver. The file system filter driver determines, based at least in part on a security policy associated with the user account, that the virtualized computing environment is authorized to access the first file or folder. The client device is caused to output a representation of contents of the first file or folder using the virtualized computing environment.

(S2) A system may be configured as described in paragraph (S1), and the at least one computer-readable medium may be further encoded with additional instructions which, when executed by the at least one processor, further cause the system to receive a second request to access a second file or folder from the client device, determine that the virtualized computing environment is not authorized to access the second file or folder, and cause the client device to output an indication that the second file or folder cannot currently be accessed using the virtual computing environment.

(S3) A system may be configured as described in paragraph (S2), and the at least one computer-readable medium may be further encoded with additional instructions which, when executed by the at least one processor, further cause the system to cause the client device to output a representation of the second file or folder together with an indication that the second file or folder cannot currently be accessed using the virtual computing environment.

(S4) A system may be configured as described in paragraphs (S2) or (S3), and the at least one computer-readable medium may be further encoded with additional instructions which, when executed by the at least one processor, further cause the system to receive a third request to access a third file or folder, determine that the virtualized computing environment is authorized for read-only access of the third file or folder, and cause the client device to output a representation of contents of the third file or folder using the virtualized computing environment.

(S5) A system may be configured as described in paragraph (S4), and the at least one computer-readable medium may be further encoded with additional instructions which, when executed by the at least one processor, further cause the system to cause the client device to output a representation of contents of the third file or folder together with an indication that the third file or folder can currently be accessed as read-only.

(S6) A system may be configured as described in paragraphs (S4) through (S5), and the at least one computer-readable medium may be further encoded with additional instructions which, when executed by the at least one processor, further cause the system to receive a fourth request to modify contents of the third file folder, and deny, based on the determination that the virtualized computing environment is authorized for read-only access of the third file folder, the fourth request.

(S7) A system may be configured as described in paragraph (S1), and the at least one computer-readable medium may be further encoded with additional instructions which, when executed by the at least one processor, further cause the system to receive a third request to access a first file in a first file folder from the client device, determine that the virtualized computing environment is authorized to access the first file based on the security policy and the identifier, cause the client device to output a representation of contents of the first file using the virtualized computing environment, receive a fourth request to access a second file in the first file folder, determine that the virtualized computing environment is not authorized to access the second file based on the security policy and the identifier, and cause the client device to output an indication that the second file cannot currently be accessed using the virtual computing environment.

(S8) A system may be configured as described in paragraph (S1), wherein the security policy specifies a first condition for accessing the first file or folder, the at least one computer-readable medium may be further encoded with additional instructions which, when executed by the at least one processor, further cause the system to calculate a first value of a risk score associated with the user account, and wherein determining that the virtualized computing environment is authorized to access the first file or folder includes determining that the first value of the risk score satisfies the first condition.

(S9) A system may be configured as described in paragraph (S8), wherein the security policy specifies a second condition for accessing the second file or folder, and determining that the virtualized computing environment is not authorized to access the second file or folder includes determining that the first value of the risk score does not satisfy the second condition.

(S10) A system may be configured as described in paragraphs (S8) or (S9), and the at least one computer-readable medium may be further encoded with additional instructions which, when executed by the at least one processor, further cause the system to calculate a second value of the risk score based on a detected behavior associated with the user account, receive a third request to access the first file or folder, determine that the virtualized computing environment is not authorized to access the first file folder based on the second value failing to satisfy the first condition, and cause the client device to output an indication that the first file or folder cannot currently be accessed using the virtual computing environment.

(S11) A system may be configured as described in paragraph (S1), and the at least one computer-readable medium may be further encoded with additional instructions which, when executed by the at least one processor, further cause the system to receive, prior to an initiation of a virtual computing session, the security policy from the client device.

(S12) A system may include at least one processor and at least one computer-readable medium encoded with instructions which, when executed by the at least one processor, cause the system to provide a virtualized computing environment associated with a user account to a client device, determine that a first icon corresponding to a first file or folder is to be presented on a display of the client device using the virtualized computing environment, determine that the virtualized computing environment currently is not authorized to access the first file or folder based at least in part on a security policy associated with the user account, and cause the client device to display the first icon together with an indication that the first file or folder cannot currently be accessed using the virtual computing environment.

(S13) A system may be configured as described in paragraph (S12), and the at least one computer-readable medium may be further encoded with additional instructions which, when executed by the at least one processor, further cause the system to receive a first request to access the first file or folder from the client device, intercept the first request by a file system filter driver, and deny the first request based on the determination that the virtualized computing environment is not authorized to access of the first file or folder.

(S14) A system may be configured as described in paragraphs (S12) or (S13), and the at least one computer-readable medium may be further encoded with additional instructions which, when executed by the at least one processor, further cause the system to determine that a second icon corresponding to a second file or folder is to be presented on the display, determine that the virtualized computing environment is authorized for read-only access of the second file or folder, and cause the client device to display the second icon together with an indication that the second file or folder can be accessed as read-only using the virtual computing environment.

(S15) A system may be configured as described in paragraph (S14), and the at least one computer-readable medium may be further encoded with additional instructions which, when executed by the at least one processor, further cause the system to receive a first request to modify the second file or folder from the client device, intercept the first request by a file system filter driver, and deny the first request to modify the second file or folder based on the determination that the virtualized computing environment is authorized for read-only access of the first file or folder.

(S16) A system may be configured as described in paragraph (S12), and the at least one computer-readable medium may be further encoded with additional instructions which, when executed by the at least one processor, further cause the system to determine that a second icon corresponding to a second file or folder is to be presented on the display, determine that the virtualized computing environment currently is authorized to access the second file or folder, and cause the client device to display the second icon together with an indication that the second file or folder can currently be accessed using the virtual computing environment.

(S16) A system may be configured as described in paragraph (S12), and the at least one computer-readable medium may be further encoded with additional instructions which, when executed by the at least one processor, further cause the system to, subsequent to causing the client device to display the second icon together with an indication that the second file or folder can currently be accessed, determine that authorization to access to the second file or folder should be revoked based at least in part on the security policy and a behavior of the client device, and cause the client device to output an indication that the second file or folder cannot currently be accessed using the virtual computing environment.

(S18) A system may include at least one processor and at least one computer-readable medium encoded with instructions which, when executed by the at least one processor, cause the system to provide a virtualized computing environment associated with a user account to a client device, receive a first request identifying a first file to be accessed using the virtualized computing environment from the client device where the first file is located within a folder, determine that the virtualized computing environment is authorized to access the first file based at least in part on a security policy associated with the user account, cause the client device to output a representation of contents of the first file using the virtualized computing environment, receive a second request identifying a second file to be accessed using the virtualized computing environment from the client device where the second file is also located within the folder, determine that the virtualized computing environment is not authorized to access the second file based at least in part on the security policy, and cause the client device to output an indication that the second file cannot currently be accessed using the virtual computing environment.

(S19) A system may be configured as described in paragraph (S18), and the at least one computer-readable medium may be further encoded with additional instructions which, when executed by the at least one processor, further cause the system to, subsequent to causing the client device to output a representation of contents of the first file, determine that authorization to access to the first file should be revoked based at least in part on the security policy and a behavior of the client device, and cause the client device to output an indication that the first file cannot currently be accessed using the virtual computing environment.

(S20) A system may be configured as described in paragraph (S18) or (S19), and the at least one computer-readable medium may be further encoded with additional instructions which, when executed by the at least one processor, further cause the system to receive a third request identifying a third file to be accessed from the client device, determining that the virtualized computing environment is authorized for read-only access of the third file based at least in part on the security policy, and cause the client device to output an indication that the third file is available read-only.

(CRM1) At least one computer-readable medium may be encoded with instructions which, when executed by at least one processor, cause the at least one processor to provide a virtualized computing environment associated with a user account to a client device, receive a first request identifying a first file or folder to be accessed using the virtualized computing environment from the client device, and intercept the first request by a file system filter driver. The file system filter driver determines, based at least in part on a security policy associated with the user account, that the virtualized computing environment is authorized to access the first file or folder. The client device is caused to output a representation of contents of the first file or folder using the virtualized computing environment.

(CRM2) At least one computer-readable medium may be encoded with instructions as described in paragraph (CRM1), and may be further encoded with additional instructions which, when executed by the at least one processor, further cause the system to receive a second request to access a second file or folder from the client device, determine that the virtualized computing environment is not authorized to access the second file or folder, and cause the client device to output an indication that the second file or folder cannot currently be accessed using the virtual computing environment.

(CRM3) At least one computer-readable medium may be encoded with instructions as described in paragraph (CRM2), and may be further encoded with additional instructions which, when executed by the at least one processor, further cause the system to cause the client device to output a representation of the second file or folder together with an indication that the second file or folder cannot currently be accessed using the virtual computing environment.

(CRM4) At least one computer-readable medium may be encoded with instructions as described in paragraphs (CRM2) or (CRM3), and may be further encoded with additional instructions which, when executed by the at least one processor, further cause the system to receive a third request to access a third file or folder, determine that the virtualized computing environment is authorized for read-only access of the third file or folder, and cause the client device to output a representation of contents of the third file or folder using the virtualized computing environment.

(CRM5) At least one computer-readable medium may be encoded with instructions as described in paragraph (CRM4), and may be further encoded with additional instructions which, when executed by the at least one processor, further cause the system to cause the client device to output a representation of contents of the third file or folder together with an indication that the third file or folder can currently be accessed as read-only.

(CRM6) At least one computer-readable medium may be encoded with instructions as described in paragraphs (CRM4) through (CRM5), and may be further encoded with additional instructions which, when executed by the at least one processor, further cause the system to receive a fourth request to modify contents of the third file folder, and deny, based on the determination that the virtualized computing environment is authorized for read-only access of the third file folder, the fourth request.

(CRM7) At least one computer-readable medium may be encoded with instructions as described in paragraph (CRM1), and may be further encoded with additional instructions which, when executed by the at least one processor, further cause the system to receive a third request to access a first file in a first file folder from the client device, determine that the virtualized computing environment is authorized to access the first file based on the security policy and the identifier, cause the client device to output a representation of contents of the first file using the virtualized computing environment, receive a fourth request to access a second file in the first file folder, determine that the virtualized computing environment is not authorized to access the second file based on the security policy and the identifier, and cause the client device to output an indication that the second file cannot currently be accessed using the virtual computing environment.

(CRM8) At least one computer-readable medium may be encoded with instructions as described in paragraph (CRM1), wherein the security policy specifies a first condition for accessing the first file or folder, the at least one computer-readable medium may be further encoded with additional instructions which, when executed by the at least one processor, further cause the system to calculate a first value of a risk score associated with the user account, and wherein determining that the virtualized computing environment is authorized to access the first file or folder includes determining that the first value of the risk score satisfies the first condition.

(CRM9) At least one computer-readable medium may be encoded with instructions as described in paragraph (CRM8), wherein the security policy specifies a second condition for accessing the second file or folder, and determining that the virtualized computing environment is not authorized to access the second file or folder includes determining that the first value of the risk score does not satisfy the second condition.

(CRM10) At least one computer-readable medium may be encoded with instructions as described in paragraphs (CRM8) or (CRM9), and may be further encoded with additional instructions which, when executed by the at least one processor, further cause the system to calculate a second value of the risk score based on a detected behavior associated with the user account, receive a third request to access the first file or folder, determine that the virtualized computing environment is not authorized to access the first file folder based on the second value failing to satisfy the first condition, and cause the client device to output an indication that the first file or folder cannot currently be accessed using the virtual computing environment.

(CRM11) At least one computer-readable medium may be encoded with instructions as described in paragraph (CRM1), and may be further encoded with additional instructions which, when executed by the at least one processor, further cause the system to receive, prior to an initiation of a virtual computing session, the security policy from the client device.

(CRM12) At least one computer-readable medium may be encoded with instructions which, when executed by at least one processor, cause the at least one processor to provide a virtualized computing environment associated with a user account to a client device, determine that a first icon corresponding to a first file or folder is to be presented on a display of the client device using the virtualized computing environment, determine that the virtualized computing environment currently is not authorized to access the first file or folder based at least in part on a security policy associated with the user account, and cause the client device to display the first icon together with an indication that the first file or folder cannot currently be accessed using the virtual computing environment.

(CRM13) At least one computer-readable medium may be encoded with instructions as described in paragraph (CRM12), and may be further encoded with additional instructions which, when executed by the at least one processor, further cause the system to receive a first request to access the first file or folder from the client device, intercept the first request by a file system filter driver, and deny the first request based on the determination that the virtualized computing environment is not authorized to access of the first file or folder.

(CRM14) At least one computer-readable medium may be encoded with instructions as described in paragraphs (CRM12) or (CRM13), and may be further encoded with additional instructions which, when executed by the at least one processor, further cause the system to determine that a second icon corresponding to a second file or folder is to be presented on the display, determine that the virtualized computing environment is authorized for read-only access of the second file or folder, and cause the client device to display the second icon together with an indication that the second file or folder can be accessed as read-only using the virtual computing environment.

(CRM15) At least one computer-readable medium may be encoded with instructions as described in paragraph (CRM14), and may be further encoded with additional instructions which, when executed by the at least one processor, further cause the system to receive a first request to modify the second file or folder from the client device, intercept the first request by a file system filter driver, and deny the first request to modify the second file or folder based on the determination that the virtualized computing environment is authorized for read-only access of the first file or folder.

(CRM16) At least one computer-readable medium may be encoded with instructions as described in paragraph (CRM12), and may be further encoded with additional instructions which, when executed by the at least one processor, further cause the system to determine that a second icon corresponding to a second file or folder is to be presented on the display, determine that the virtualized computing environment currently is authorized to access the second file or folder, and cause the client device to display the second icon together with an indication that the second file or folder can currently be accessed using the virtual computing environment.

(CRM16) At least one computer-readable medium may be encoded with instructions as described in paragraph (CRM12), and may be further encoded with additional instructions which, when executed by the at least one processor, further cause the system to, subsequent to causing the client device to display the second icon together with an indication that the second file or folder can currently be accessed, determine that authorization to access to the second file or folder should be revoked based at least in part on the security policy and a behavior of the client device, and cause the client device to output an indication that the second file or folder cannot currently be accessed using the virtual computing environment.

(CRM18) At least one computer-readable medium may be encoded with instructions which, when executed by at least one processor, cause the at least one processor to provide a virtualized computing environment associated with a user account to a client device, receive a first request identifying a first file to be accessed using the virtualized computing environment from the client device where the first file is located within a folder, determine that the virtualized computing environment is authorized to access the first file based at least in part on a security policy associated with the user account, cause the client device to output a representation of contents of the first file using the virtualized computing environment, receive a second request identifying a second file to be accessed using the virtualized computing environment from the client device where the second file is also located within the folder, determine that the virtualized computing environment is not authorized to access the second file based at least in part on the security policy, and cause the client device to output an indication that the second file cannot currently be accessed using the virtual computing environment.

(CRM19) At least one computer-readable medium may be encoded with instructions as described in paragraph (CRM18), and may be further encoded with additional instructions which, when executed by the at least one processor, further cause the system to, subsequent to causing the client device to output a representation of contents of the first file, determine that authorization to access to the first file should be revoked based at least in part on the security policy and a behavior of the client device, and cause the client device to output an indication that the first file cannot currently be accessed using the virtual computing environment.

(CRM20) At least one computer-readable medium may be encoded with instructions as described in paragraphs (CRM18) or (CRM19), and may be further encoded with additional instructions which, when executed by the at least one processor, further cause the system to receive a third request identifying a third file to be accessed from the client device, determining that the virtualized computing environment is authorized for read-only access of the third file based at least in part on the security policy, and cause the client device to output an indication that the third file is available read-only.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed by a computing system, comprising:
   providing, to a client device, a virtualized computing environment associated with a user account;
   receiving, from the client device, a first request identifying a first file or folder to be accessed using the virtualized computing environment;
   intercepting, by a file system filter driver, the first request;
   receiving, by the file system filter driver, a security policy associated with the user account;
   determining, by the file system filter driver and based at least in part on the security policy, that the client device is authorized to access the first file or folder using the virtualized computing environment; and
   in response to determining that the client device is authorized to access the first file or folder using the virtualized computing environment, causing the client device to output a representation of contents of the first file or folder using the virtualized computing environment.

2. The method of claim 1, further comprising:
   receiving, from the client device, a second request identifying a second file or folder to be accessed using the virtualized computing environment;
   intercepting, by the file system filter driver, the second request;
   determining, by the file system filter driver and based at least in part on the security policy, that the client device is not authorized to access the second file or folder using the virtualized computing environment; and
   in response to determining that the client device is not authorized to access the second file or folder using the virtualized computing environment, causing the client device to output an indication that the second file or folder cannot currently be accessed using the virtualized computing environment.

3. The method of claim 2, further comprising:
   causing the client device to output a representation of the second file or folder together with an indication that the second file or folder cannot currently be accessed using the virtualized computing environment.

4. The method of claim 2, further comprising:
   receiving a third request identifying a third file or folder to be accessed using the virtualized computing environment;
   intercepting, by the file system filter driver, the third request;
   determining, by the file system filter driver and based at least in part on the security policy, that the client device is authorized for read-only access of the third file or folder using the virtualized computing environment; and
   in response to determining that the client device is authorized for read-only access of the third file or folder using the virtualized computing environment, causing the client device to output a representation of contents of the third file or folder using the virtualized computing environment.

5. The method of claim 4, further comprising:
   causing the client device to output a representation of contents of the third file or folder together with an indication that the third file or folder can currently be accessed as read-only.

6. The method of claim 4, further comprising:
   receiving a fourth request to modify contents of the third file or folder; and
   denying, based on the determination that the client device is authorized for read-only access of the third file or folder using the virtualized computing environment, the fourth request.

7. The method of claim 1, further comprising:
   receiving, from the client device, a second request identifying a second file in a first file folder to be accessed using the virtualized computing environment;
   intercepting, by the file system filter driver, the second request;
   determining, by the file system filter driver and based at least in part on the security policy, that the client device is authorized to access the second file using the virtualized computing environment;
   in response to determining that the client device is authorized to access the second file using the virtualized computing environment, causing the client device to output a representation of contents of the second file using the virtualized computing environment,
   receiving a third request identifying a third file in the first file folder to be accessed using the virtualized computing environment;
   intercepting, by the file system filter driver, the third request;
   determining, by the file system filter driver and based at least in part on the security policy, that the client device is not authorized to access the third file using the virtualized computing environment; and
   in response to determining that the client device is not authorized to access the third file using the virtualized computing environment, causing the client device to output an indication that the third file cannot currently be accessed using the virtualized computing environment.

8. The method of claim 1, wherein:
   the security policy specifies a first condition for accessing the first file or folder; and
   the method further comprises:
      calculating a first value of a risk score associated with the user account; and
      determining that the client device is authorized to access the first file or folder using the virtualized computing environment includes determining that the first value of the risk score satisfies the first condition.

9. The method of claim 2, wherein:
   the security policy specifies a first condition for accessing the first file or folder and a second condition for accessing the second file or folder; and
   the method further comprises:
      calculating a first value of a risk score associated with the user account;
      determining that the client device is authorized to access the first file or folder using the virtualized computing environment includes determining that the first value of the risk score satisfies the first condition; and determining that the client device is not authorized to access the second file or folder includes determining that the first value of the risk score does not satisfy the second condition.

10. The method of claim 8, further comprising:
calculating a second value of the risk score based on a detected behavior associated with the user account;
receiving a second request identifying the first file or folder to be accessed using the virtualized computing environment;
intercepting, by the file system filter driver, the second request;
determining, by the file system filter driver and based at least in part on the second value failing to satisfy the first condition, that the client device is not authorized to access the first file or folder using the virtualized computing environment; and
causing the client device to output an indication that the first file or folder cannot currently be accessed using the virtualized computing environment.

11. The method of claim 1, further comprising:
receiving, by the file system filter driver and prior to providing the virtualized computing environment to the client device, the security policy from the client device.

12. A method performed by a computing system, comprising:
providing, to a client device, a virtualized computing environment associated with a user account;
determining that a first icon corresponding to a first file or folder is to be presented on a display of the client device using the virtualized computing environment;
determining, based at least in part on a security policy associated with the user account, that the client device currently is not authorized to access the first file or folder using the virtualized computing environment; and
causing the client device to display the first icon modified with an indication that the first file or folder cannot currently be accessed using the virtualized computing environment.

13. The method of claim 12, further comprising:
receiving, from the client device, a first request to access the first file or folder;
intercepting, by a file system filter driver, the first request; and
denying, based on the determination that the client device is not authorized to access of the first file or folder using the virtualized computing environment, the first request.

14. The method of claim 12, further comprising:
determining that a second icon corresponding to a second file or folder is to be presented on the display;
determining that the client device is authorized for read-only access of the second file or folder using the virtualized computing environment; and
causing the client device to display the second icon modified with an indication that the second file or folder can be accessed as read-only using the virtualized computing environment.

15. The method of claim 14, further comprising:
receiving, from the client device, a first request to modify the second file or folder;
intercepting, by a file system filter driver, the first request; and
denying, based on the determination that the client device is authorized for read-only access of the first file or folder using the virtualized computing environment, the first request to modify the second file or folder.

16. The method of claim 12, further comprising:
determining that a second icon corresponding to a second file or folder is to be presented on the display;
determining that the client device currently is authorized to access the second file or folder using the virtualized computing environment; and
causing the client device to display the second icon modified with an indication that the second file or folder can currently be accessed using the virtualized computing environment.

17. The method of claim 16, further comprising, subsequent to causing the client device to display the second icon modified with an indication that the second file or folder can currently be accessed using the virtualized computing environment:
determining, based at least in part on the security policy and a behavior of the client device, that authorization to access to the second file or folder is to be revoked; and
causing the client device to output an indication that the second file or folder cannot currently be accessed using the virtualized computing environment.

18. A method performed by a computing system, comprising:
providing, to a client device, a virtualized computing environment associated with a user account;
receiving, from the client device, a first request identifying a first file to be accessed using the virtualized computing environment, the first file being located within a folder;
receiving a security policy associated with the user account;
determining, based at least in part on the security policy, that the client device is authorized to access the first file using the virtualized computing environment;
causing the client device to output a representation of contents of the first file using the virtualized computing environment;
receiving, from the client device, a second request identifying a second file to be accessed using the virtualized computing environment, the second file also being located within the folder;
determining, based at least in part on the security policy, that the client device is not authorized to access the second file using the virtualized computing environment; and
causing the client device to output an indication that the second file cannot currently be accessed using the virtualized computing environment.

19. The method of claim 18, further comprising, subsequent to causing the client device to output the representation of the contents of the first file:
determining, based at least in part on the security policy and a behavior of the client device, that authorization to access to the first file is to be revoked; and
causing the client device to output an indication that the first file cannot currently be accessed using the virtualized computing environment.

20. The method of claim 18, further comprising:
receiving, from the client device, a third request identifying a third file to be accessed using the virtualized computing environment;
determining, based at least in part on the security policy, that the client device is authorized for read-only access of the third file using the virtualized computing environment; and causing the client device to output an indication that the third file is available read-only.

21. The method of claim 1, wherein the security policy supersedes an authorization granted to the user account to access the first file or folder from with a private network.

22. The method of claim 1, further comprising:
sending, by the file system filter driver, data representing the first request to an operating system; and
receiving, by the file system filter driver, the contents of the first file or folder.

23. The method of claim 12, wherein the indication is a symbol superimposed over the first icon.

* * * * *